United States Patent
Dines et al.

(10) Patent No.: US 10,610,438 B1
(45) Date of Patent: Apr. 7, 2020

(54) RESISTIVE LOCALIZED REHABILITATION EXOSKELETON

(71) Applicants: Sergei Thomas Dines, Land O'Lakes, FL (US); Kamal Husam Habboub, Tampa, FL (US); Marco Alejandro Soto, Lantana, FL (US)

(72) Inventors: Sergei Thomas Dines, Land O'Lakes, FL (US); Kamal Husam Habboub, Tampa, FL (US); Marco Alejandro Soto, Lantana, FL (US)

(73) Assignee: University of South Florida, Tampa, FL (US)

( * ) Notice: Subject to any disclaimer, the term of this patent is extended or adjusted under 35 U.S.C. 154(b) by 262 days.

(21) Appl. No.: 15/816,296

(22) Filed: Nov. 17, 2017

Related U.S. Application Data

(60) Provisional application No. 62/423,491, filed on Nov. 17, 2016.

(51) Int. Cl.
*A61H 1/02* (2006.01)
*F16H 1/06* (2006.01)
(Continued)

(52) U.S. Cl.
CPC ............ *A61H 1/02* (2013.01); *F16D 11/16* (2013.01); *F16H 1/06* (2013.01); *F16H 19/001* (2013.01);
(Continued)

(58) Field of Classification Search
CPC .......... A61H 1/00; A61H 1/02; A61H 1/0274; A61H 1/0277; A61H 2201/1215;
(Continued)

(56) References Cited

U.S. PATENT DOCUMENTS

| 7,438,727 B2 * | 10/2008 | Williams, III ......... A61F 2/581 623/57 |
| 8,409,118 B2 | 4/2013 | Agrawal et al. |
| 2013/0289452 A1 | 10/2013 | Smith et al. |

OTHER PUBLICATIONS

Ritesh Adhikari et al., Exomuscular Robotic Sleeve for Upper Limb Stroke Rehabilitation, WPI Automation and Interventional Medicine Laboratory; Scott Oshiro et al., ExoArm, ECE-493 Final Report, pp. 1-363.
(Continued)

*Primary Examiner* — Peter S Vasat
*Assistant Examiner* — Danielle Roman
(74) *Attorney, Agent, or Firm* — Nicholas Pfeifer; Smith & Hopen, P.A.

(57) ABSTRACT

Injury-specific resistive exoskeleton devices and iris-based mechanisms utilized therein. The devices assist those currently in rehabilitation or those who have lost partial or all motion to specific muscles. The device can be used for directly driving a limb or providing resistance to partially impaired muscles. For example, the device can provide a resistive force during contraction of an affected/injured muscle and release the resistive force during contraction of an unaffected/healthy muscle. The iris-based joint mechanism generally includes a hub, an iris mechanism, and a plurality of teeth disposed therebetween. When the teeth are engaged with the hub, the mechanism is locked and the servo outputs a rotational force that affects rotation of the user's limb. When the teeth are disengaged with the hub, the mechanism is unlocked and the user has full range of motion of the underlying hinge joint.

16 Claims, 25 Drawing Sheets

(51) Int. Cl.
*F16D 11/16* (2006.01)
*F16H 19/00* (2006.01)

(52) U.S. Cl.
CPC .... *A61H 1/0277* (2013.01); *A61H 2201/1215* (2013.01); *A61H 2201/1472* (2013.01); *A61H 2201/165* (2013.01); *A61H 2201/1638* (2013.01); *A61H 2201/5007* (2013.01)

(58) Field of Classification Search
CPC ........ A61H 2201/1261; A61H 2201/14; A61H 2201/1635; A61H 2201/1638; A61H 2201/165; A61H 2201/5007; A61H 2201/5064; A61H 2205/06; F16H 1/06; F16D 11/16; F16D 28/00
See application file for complete search history.

(56) References Cited

OTHER PUBLICATIONS

Tobias Nef et al., ARMin—Exoskeleton Robot for Stroke Rehabilitation, O. Dössel and W C. Schlegel. (Eds.): WC 2009, IFMBE Proceedings 25/IX, pp. 127-130, 2009.

\* cited by examiner

RESISTIVE LOCALIZED REHABILITATION EXOSKELETON

CROSS-REFERENCE TO RELATED APPLICATIONS

This nonprovisional application claims priority to U.S. Provisional Patent Application No. 62/423,491, entitled "Resistive Localized Rehabilitation Exoskeleton for Triceps Extension and Position Control", filed Nov. 17, 2016 by the same inventors, the entirety of which is incorporated herein by reference.

BACKGROUND OF THE INVENTION

1. Field of the Invention

This invention relates, generally, to rehabilitation devices. More specifically, it relates to resistive localized rehabilitation exoskeletons.

2. Brief Description of the Prior Art

Rehabilitation exoskeletons have revolutionized and automated the rehabilitation and recovery process but often are costly, are heavy, and rehabilitate parts of the body that do not need assistive recovery. Examples include U.S. Pat. No. 8,409,118; U.S. Patent Application Publication No. 2013/0289452; Ritesh Adhikari et al., Exomuscular Robotic Sleeve for Upper Arm Stroke Rehabilitation, WPI Automation and Interventional Medicine Laboratory; Scott Oshiro et al., ExoArm, ECE-493 Final Report; and Tobias Nef et al., ARMin—Exoskeleton Robot for Stroke Rehabilitation, O. Dössel and W C. Schlegel. (Eds.): WC 2009, IFMBE Proceedings 25/IX, pp. 127-130, 2009. However, conventional devices are overly expensive (typically thousands of dollars), unsafe (requiring trained personnel within the vicinity), overly noisy (greater than conversation level of 60 dB), and excessively heavy (often requiring a table or floor to rest on and are 5 lbs. or more). Specifically regarding safety, conventional devices are rigidly affixed to the underlying hinge joint, many without an ability to disengage, thus posing unsafe conditions for the user's rehabilitation.

Accordingly, what is needed is an improved rehabilitation exoskeleton that is localized to the body part being rehabilitated. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved rehabilitation exoskeleton and underlying mechanism thereof is now met by a new, useful, and nonobvious invention.

In an embodiment, the current invention is an iris-based hinge joint mechanism for a rehabilitation exoskeleton, where the mechanism has an engaged position and a disengaged position. The hinge joint mechanism includes an iris mechanism and a hub in communication with each other, and the iris mechanism further includes a plurality of key elements. In the engaged position, one end of each key element engages the hub to lock the hub with the iris mechanism, such that the hub and iris mechanism rotate together. In the disengaged position, this end of each key element does not engage the hub, such that the hub is freely rotatable relative to the iris mechanism. In both positions, the opposite end of each key element is slidably disposed within elongate channels in the iris mechanism in the engaged and disengaged positions.

In more specific embodiments, the current invention is an iris-based hinge joint mechanism for a rehabilitation exoskeleton, where the mechanism has an engaged position and a disengaged position. The mechanism includes a hub, a plate, a gear assembly, and a plurality of key elements. An actuator (e.g., button) may transition the mechanism and its components between this engaged and disengaged position.

The hub includes a plurality of crenellations, and a main servo is positioned in rigid communication with the hub for driving rotation of the hub. The plate is positioned adjacent to the hub, where the plate includes a plurality of notches disposed through the plate. The notches are aligned with the hub crenellations in the mechanism's engaged position, such that the crenellation-notch alignment forms a channel therebetween. In the disengaged position, the notches and crenellations are not aligned and there is no channel formed. Optionally, the mechanism further includes a cap that restricts movement of the hub, while permitting rotation thereof.

The gear assembly includes a driving gear and a driven gear. The driven gear has a plurality of elongate channels disposed therethrough and along the perimeter thereof, where the elongate channels are angled between the perimeter and the center of the driven gear. The driving gear is disposed in communication with the driven gear, with a secondary servo in communication with the driving gear for driving rotation of the driving gear. The driven gear may have teeth disposed partially therearound, and the driving gear may have teeth that mesh with the driven gear's teeth, such that rotation of the driving gear drives rotation of the driven gear.

The key elements each have a first end (e.g., flange) disposed within a plate notch and a second end (e.g., pin) slidably disposed within the driven gear's elongate channel. In the disengaged position, the flange end is not disposed in a crenellation of the hub, and in the engaged position, the flange end is partially disposed in the plate notch and partially disposed in the hub crenellation. In this way, in the disengaged position, the hub may be freely rotatable relative to the remainder of the iris-based hinge joint mechanism, such that a user has full range of motion of a limb wearing the rehabilitation exoskeleton. Additionally, in the engaged position, the hub is locked with the remainder of the iris-based hinge joint mechanism, and the main servo outputs a force to drive rotation of the hub with the remainder of the iris-based hinge joint mechanism, such that the user has a single range of motion of the limb wearing the rehabilitation exoskeleton. An amount of this force may be controllable by an adjustable amount of voltage supplied by the main servo.

Optionally, the mechanism further includes a potentiometer in communication with the hub, where the potentiometer tracks a rotational position of the hub. Upon transition from the disengaged position to the engaged position, the potentiometer automatically directs the main servo to rotate the hub so that the plurality of crenellations of the hub align with the plurality of notches of the plate.

Optionally, the mechanism further includes a spacer positioned on a side of the driven gear opposite from the plate, where the spacer provides a distance between the gears and a lower limb-securing component of the rehabilitation exoskeleton.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 10E is a side view of the iris mechanism of FIG. 10A.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Exoskeleton

It is an object of the current invention to provide a mechanism that can assist a stroke victim who has lost the ability to extend or retract various muscles in a full range of motion, for example during rehabilitation of the user's arm. A mechatronic device is discussed herein, as servos are more effective than linkages at transmitting torque, and the device can be engaged and disengaged in order to ensure safety and to allow the user to have full control of the muscle being assisted. It is contemplated herein that the device is functional not only for motion assist, but also with rehabilitation of muscles that may require constant motion.

The current invention is an injury-specific resistive exoskeleton device for assisting individuals in rehabilitation or those who have lost partial or all motion to specific muscles. The device can be used to directly drive a limb or to provide resistance to partially impaired muscles.

Figure 1:
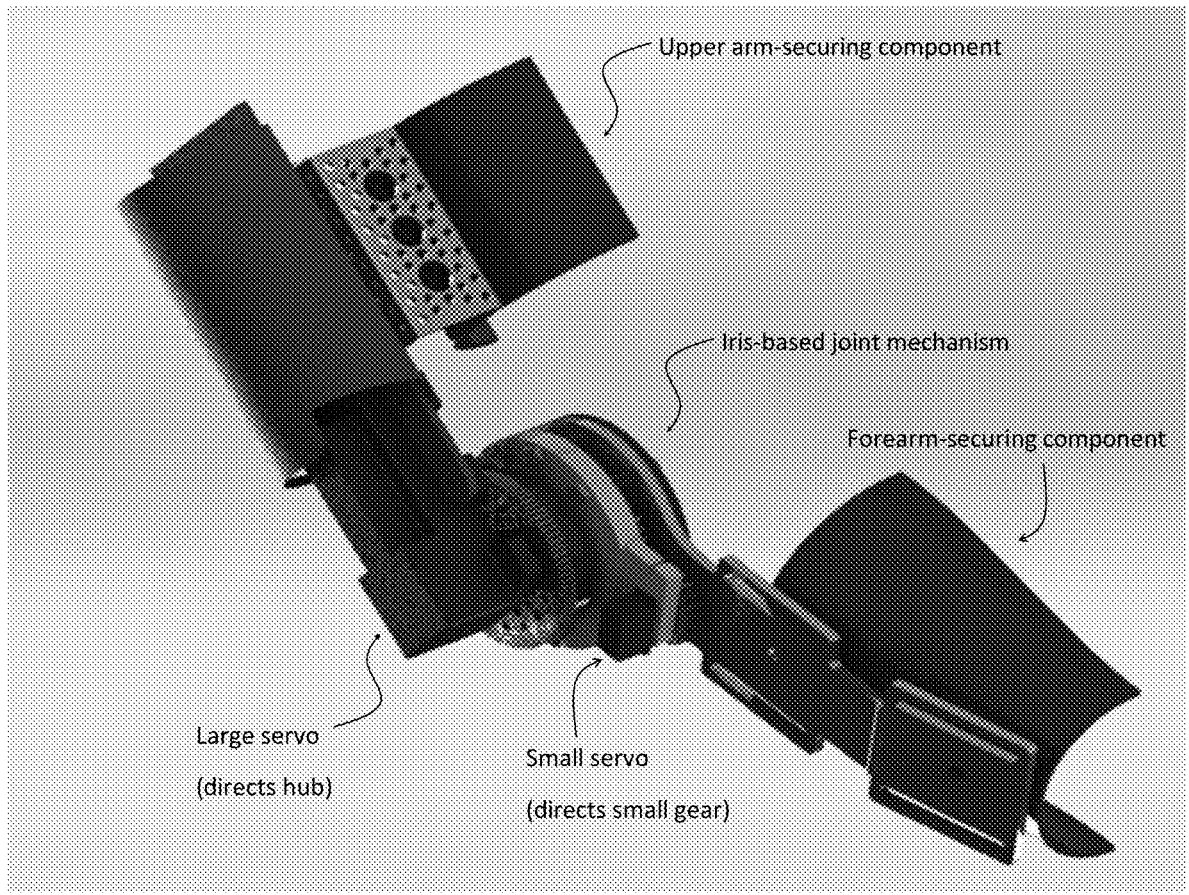
FIG. 1 is a perspective view of a rehabilitation device/exoskeleton for an impaired arm, according to an embodiment of the current invention. Because of the iris mechanism in the joint, there is quite a bit of clearance for full range of motion.
Figure 2A:
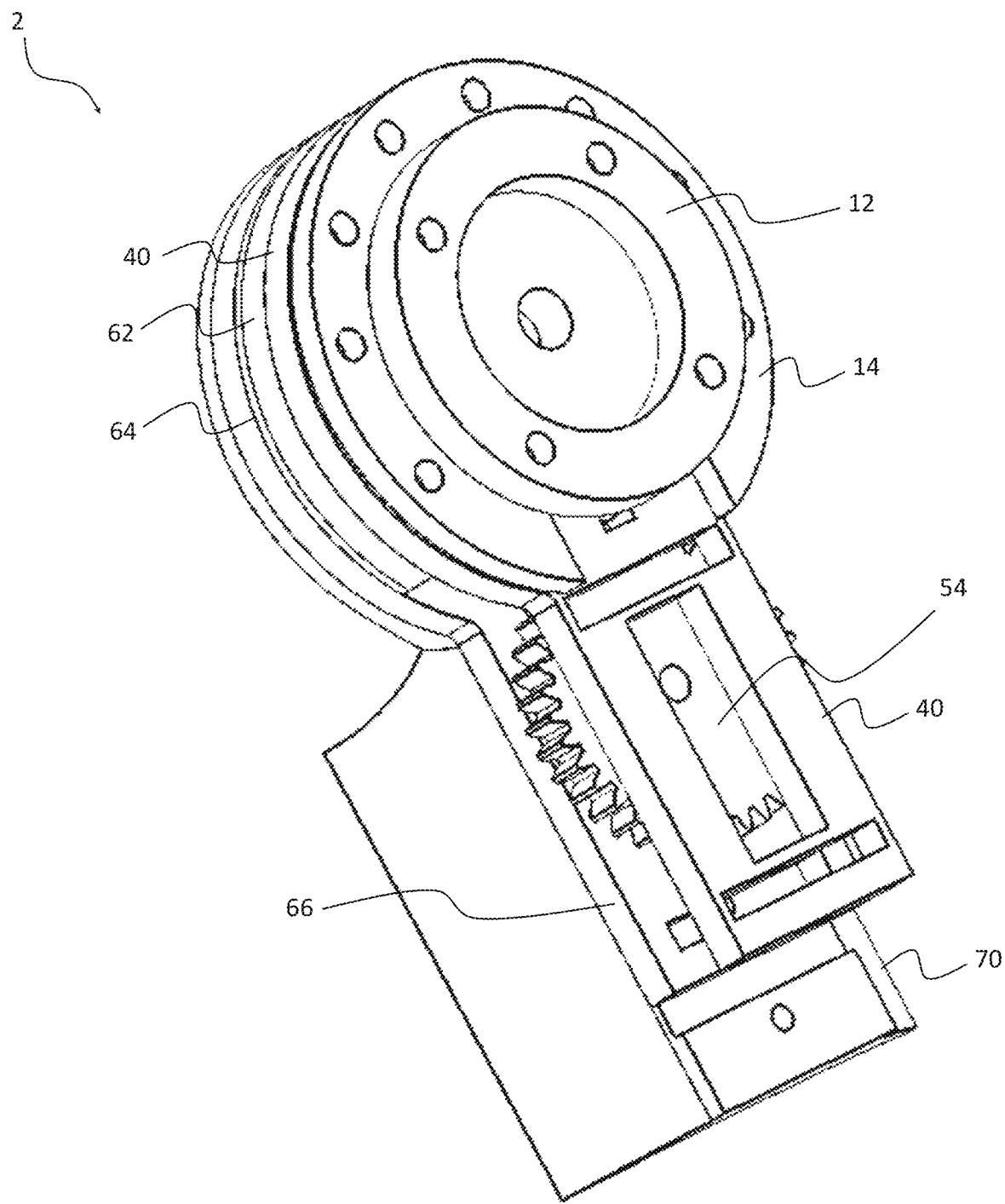
FIG. 2A is a perspective view of an iris-based joint mechanism, according to an embodiment of the current invention.
Figure 2B:
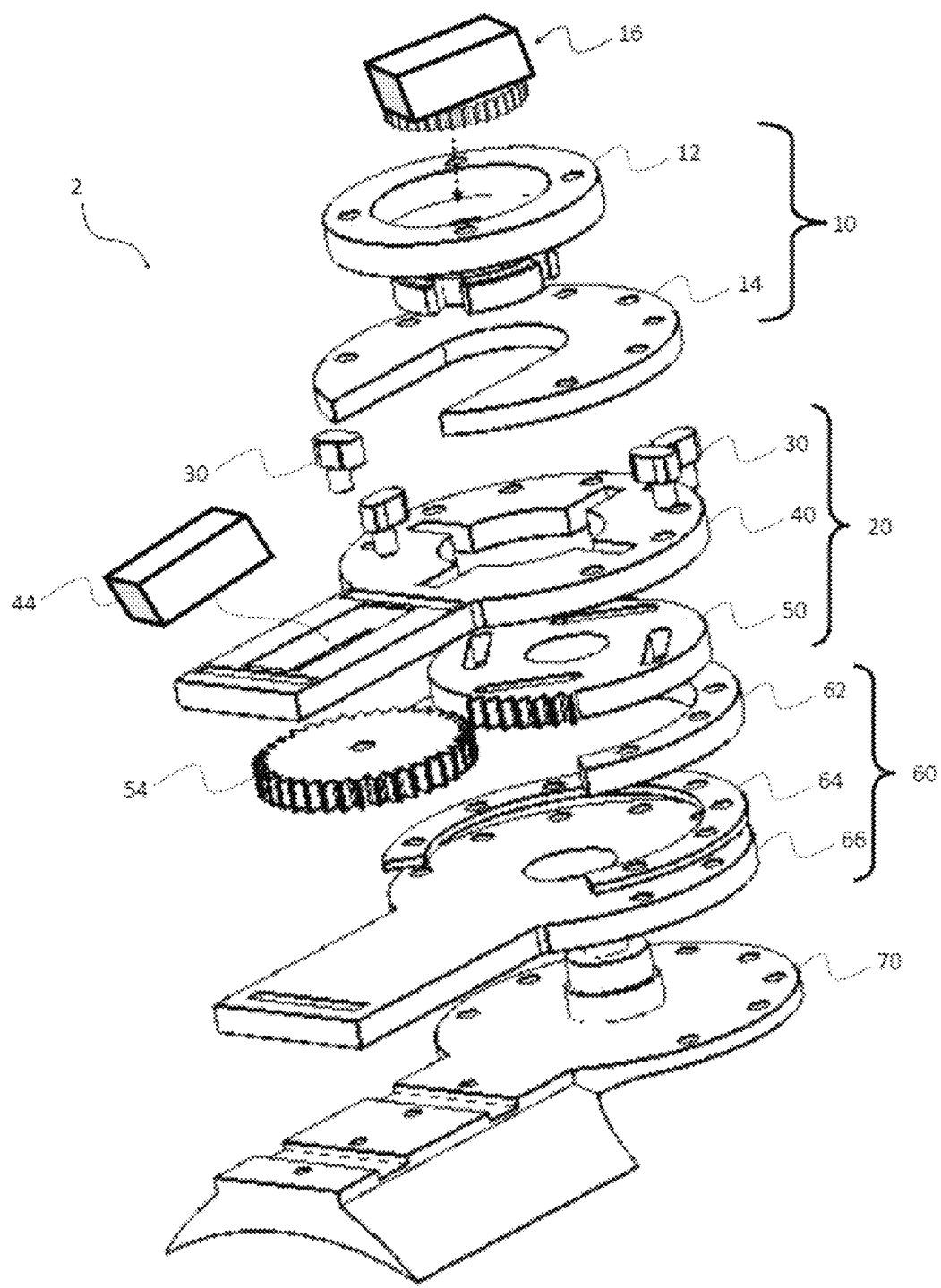
FIG. 2B is an exploded view of the mechanism of FIG. 2A.
Figure 2C:
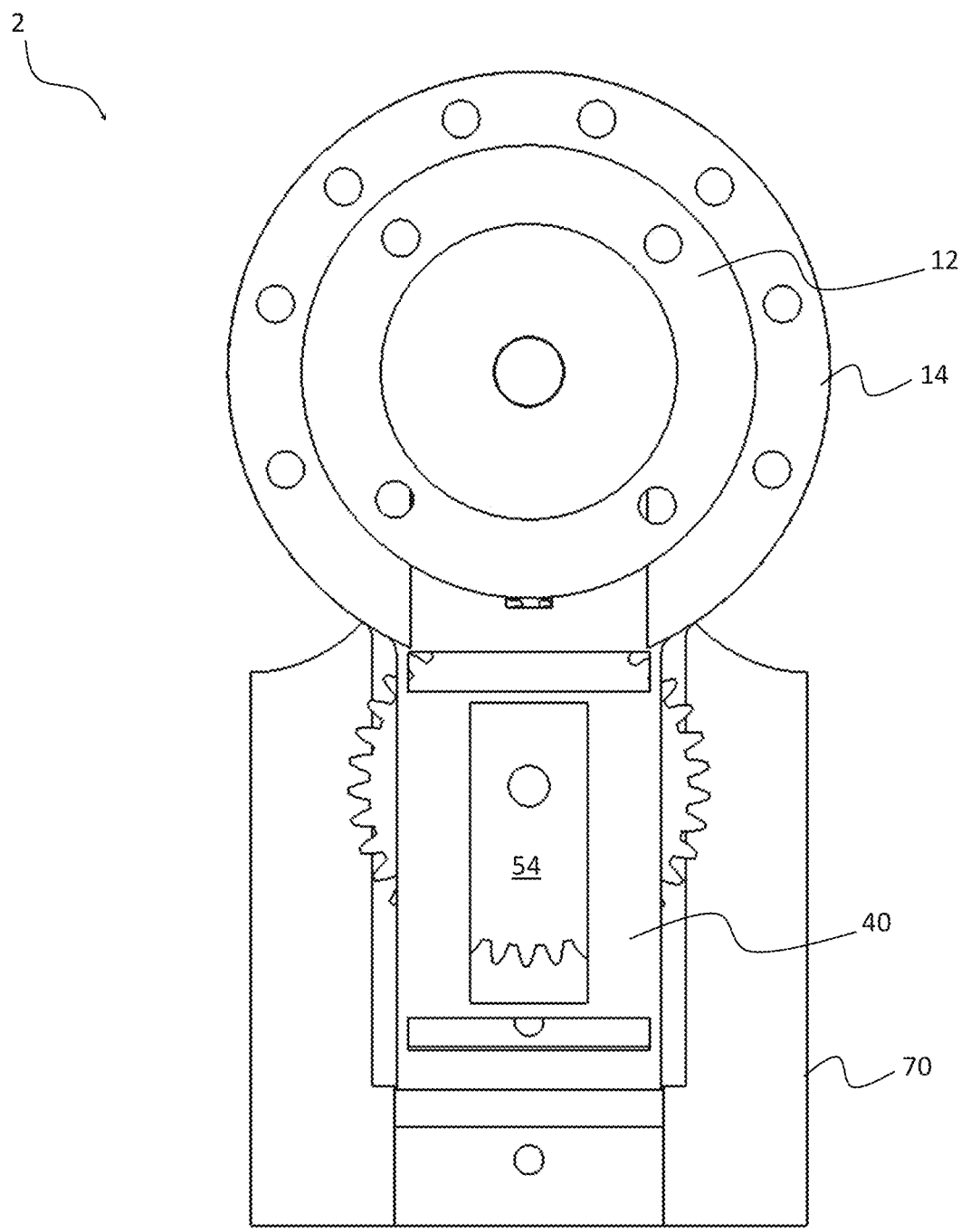
FIG. 2C is an elevated front view of the mechanism of FIG. 2A.
Figure 2D:
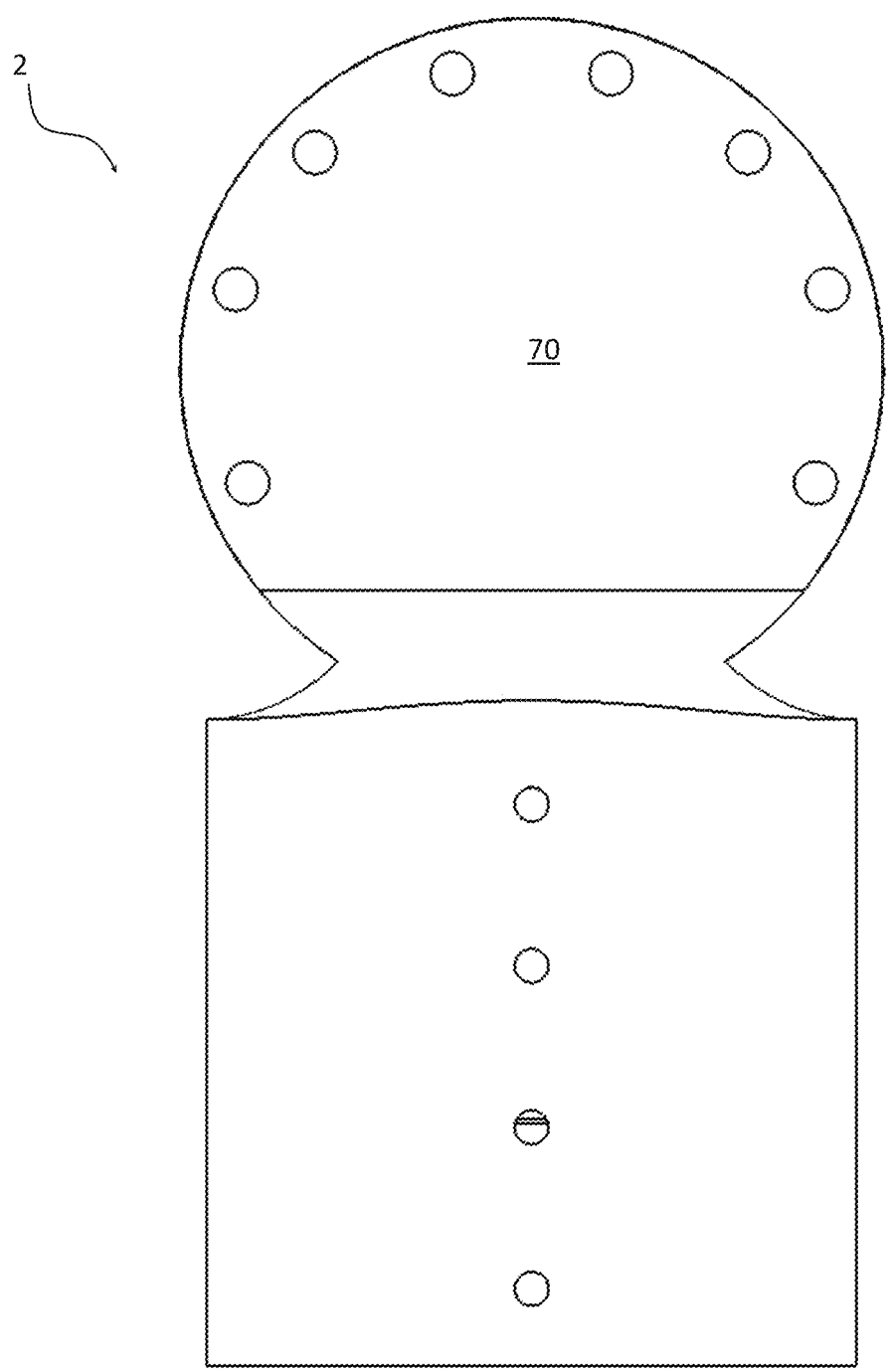
FIG. 2D is an elevated rear view of the mechanism of FIG. 2A.
Figure 2E:
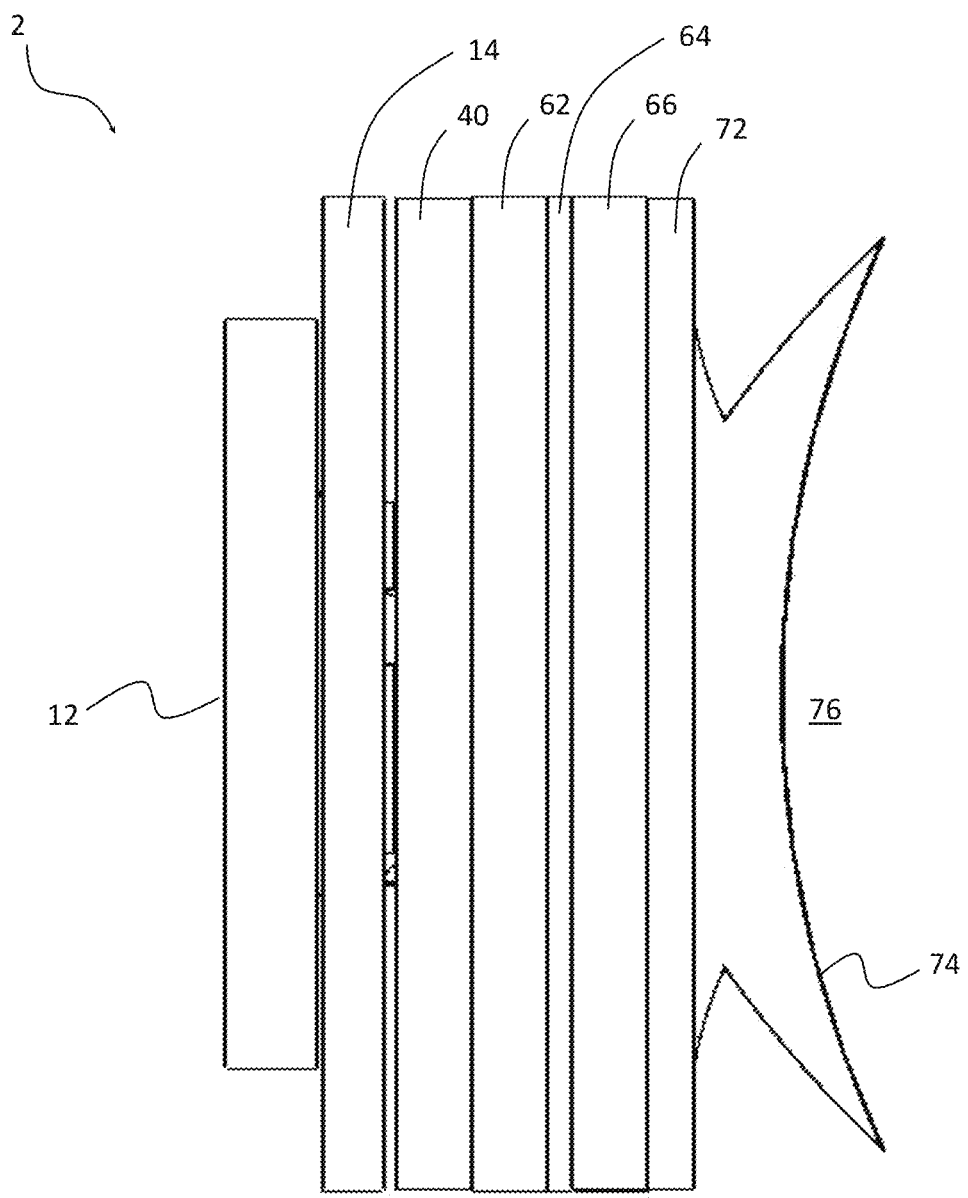
FIG. 2E is a top view of the mechanism of FIG. 2A.
Figure 2F:
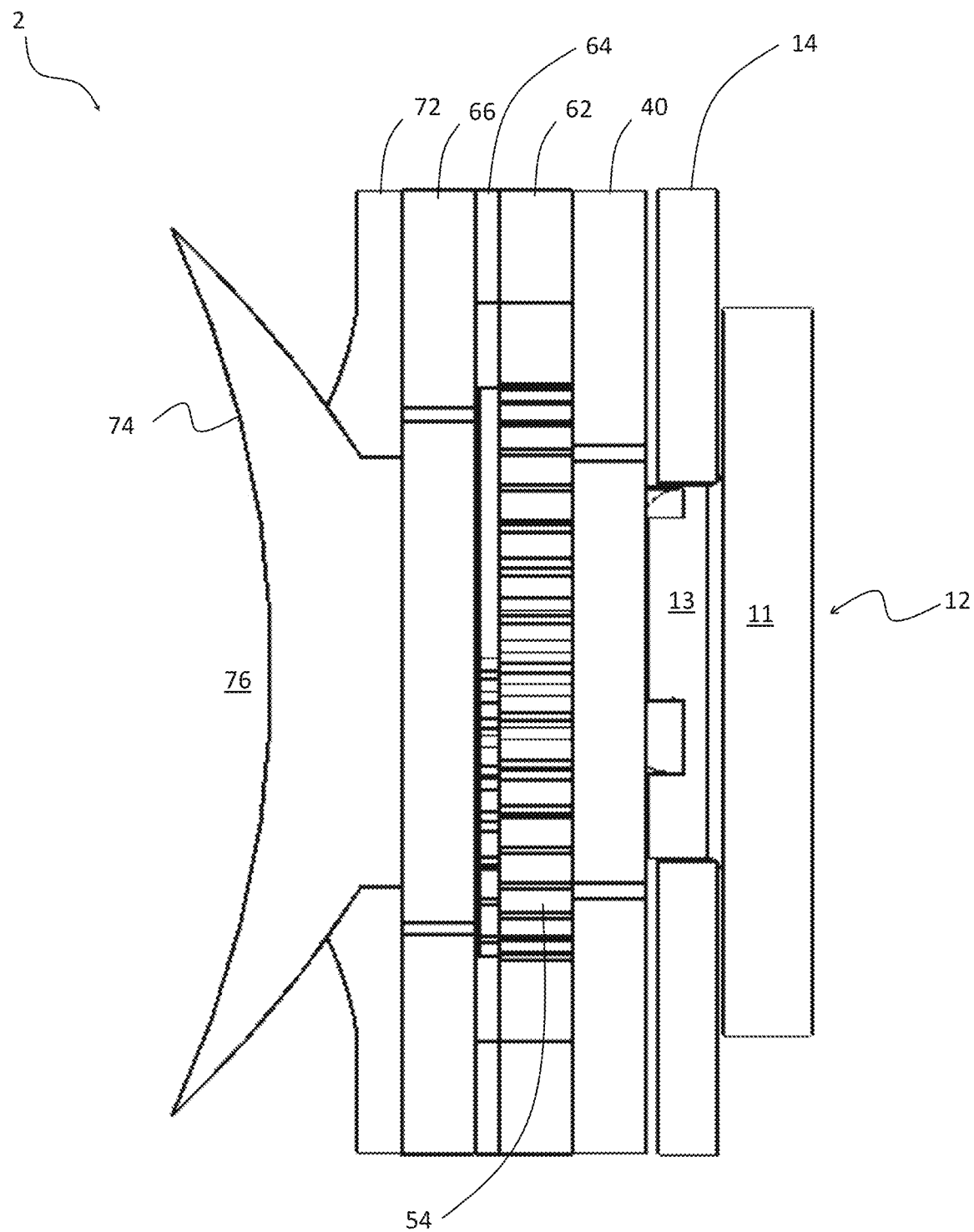
FIG. 2F is a bottom view of the mechanism of FIG. 2A.
Figure 2G:
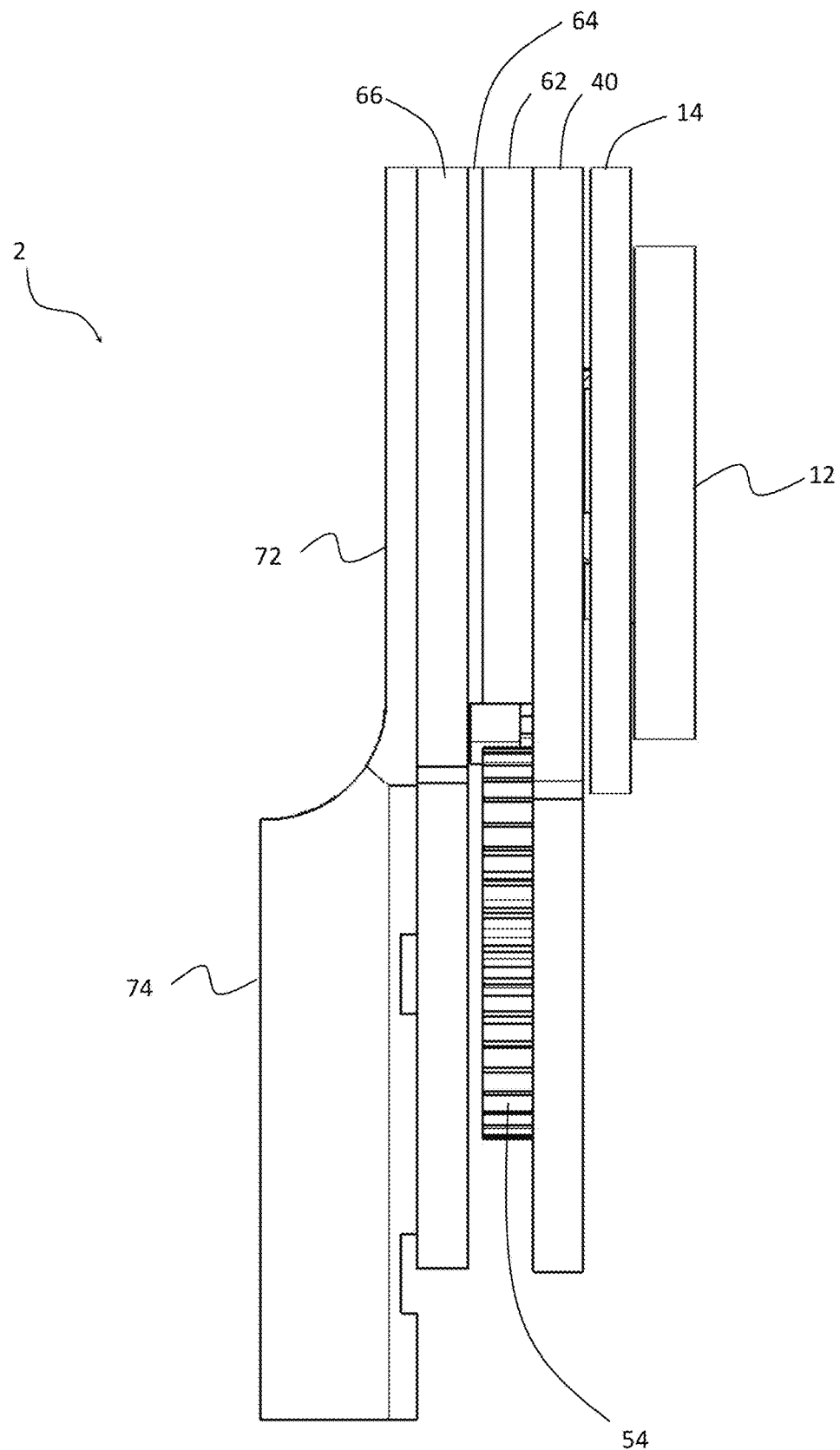
FIG. 2G is a side view of the mechanism of FIG. 2A.

In certain embodiments, the current device is a robotic, resistive rehabilitation device that can be used on various limbs, such as a user's arm, as can be seen in FIG. 1. FIG. 1 illustrates the device with an upper limb component that is secured to the upper portion of the limb (e.g., arm) being rehabilitated, a lower limb component that is secured to the lower portion of the limb being rehabilitated, and a central hub that rotatably couples the upper limb component and lower limb component together.

The device includes a robotic component, as it is equipped with a joystick that can be controlled by the patient and/or trained personnel. The device includes a resistive component, and its power can vary, having range from about 5 lbs. to about 14 lbs. of resistance if the user was to apply force against the motor. The device is also safe, utilizing an engage-and-disengage mechanism unlike conventional exoskeletons that directly drive the limb. Further, there is an electrical kill switch, computer-coded stops, and a physical mechanical stop to avoid hyperextension.

The exoskeleton device and each of its components can be formed of any suitable material. The interference pieces that engage and disengage the servo can be formed of a polymer, the frame of the body can be formed of aluminum, and any conventional elbow immobilizer can be utilized for the padding and fastening components.

Iris-Based Joint Mechanism

In an embodiment, the current invention is an iris-based joint mechanism that can be used with an exoskeleton to drive rotation (e.g., contraction, extension) of appropriate components, such as an upper arm component and a forearm component (see FIG. 1). The joint mechanism is detachable as needed and can be engaged and disengaged whenever the user chooses, to directly drive an impaired or absent limb or muscle, to provide resistive training of muscles, to provide multiple surfaces for transmitting torque, and/or to rehabilitate specific ranges of motion (e.g., by attaching and detaching the device at the respective angle of interest). In certain iterations, the iris-based mechanism permits the exoskeleton/device to output a resistive force when rehabilitating a particular muscle moving in a particular direction, and then release that resistive force when an unaffected muscle is contracting (no resistive force so as to prevent atrophy of the unaffected muscle). This resistive force is adjustable, based on power supplied to control the torque during rotation of the upper and lower limb components.

The control system within the rehabilitation system is an ARDUINO® based system, for example, and includes a microcontroller that is adaptable to include other buttons/inputs, user inputs, sensors, and features. It is also contemplated that the control system includes on-board analog-to-digital conversion with easy potentiometer tracking.

The user interface display may include a heads-up display that displays the device battery level, the device status (engaged or disengaged), or other vitals desired.

The effectiveness of the system typically depends on its application. For example, for application as a resistive rehabilitation device, it can provide about 5-14 lbs. of resistance for a 130-lb individual by varying the power voltage. See Table 1.

TABLE 1

| SPG7950A | Max. Rotation | Weight (w/ Servo) | 4.8 V Power (oz-inch) | 6.0 V Power (oz-inch) | 7.4 V Power (oz-inch) | 4.8 V Speed (sec/60°) | 6.0 V Speed (sec/60°) | 7.4 V Speed (sec/60°) |
|---|---|---|---|---|---|---|---|---|
| HS-7950TH (2:1 ratio) | 180° | 8.95 oz | 688 | 804 | 972 | .36 sec | .3 sec | .26 sec |
| HS-7950TH (3:1 ratio) | 180° | 8.95 oz | 1032 | 1206 | 1458 | .54 sec | .45 sec | .39 sec |
| HS-7950TH (3.8:1 ratio) | 180° | 8.95 oz | 1307.2 | 1527.26 | 1846.8 | .684 sec | .57 sec | .494 sec |
| HS-7950TH (5:1 ratio) | 180° | 8.95 oz | 1720 | 2010 | 2430 | .9 sec | .75 sec | .65 sec |
| HS-7950TH (7:1 ratio) | 180° | 9.05 oz | 2408 | 2814 | 3402 | 1.26 sec | 1.05 sec | 0.91 sec |

2408 oz-in = 151 lb-in = 19 lbs 8 inch out
3402 oz-in = 213 lb-in = 27 lbs 8 inch out
*Person weighs 130 lbs: arm = 130 × 0.10 = 13 lbs: therefore 19 − 13 = 5 lbs and 27 − 13 = 14 lbs.
Note:
the arm weight is subtracted from the hold weight (19 and 27 lbs) because the motors need to hold the arm weight and whatever is left over is the resistance that the motor can give.

As a direct drive device, the maximum allowable weight of a person wearing the device is 270 lbs with factor of safety of zero.

$$\% \ W_{arm} \times W_{person} \leq W_{max \ of \ motor} \rightarrow 0.10 \times W \leq 27 \ lbs \therefore W_{max} \leq 270 \ lbs$$

Arm weight is about 7% total weight
Used 10% in calculations as a conservative value
User Interfacing.

The input to control the speed and motion of the exoskeleton is natural and non-invasive. This input can be achieved in any suitable manner, though a joy stick was used and found to provide proper control of the device. It should be noted that this input control can be customized for different users.

Motor Effectiveness.

For natural motion, a motor was used that could provide high torque near the elbow, and a servo that directly drives the arm was the most natural choice. The motor choice was also based on safety. The chosen motor permitted easy modification or addition in order to create an engage/disengage mechanism. The engage/disengage mechanism allows the user to maintain control of the device, which aids in the prevention of any further muscular atrophy.

Engage/Disengage Mechanism.

The mechanism responsible for attaching and detaching the servo motor to the lower arm was an iris based mechanism. The clutch device can be replaced with a direct drive exoskeleton, and a new mechanism can be fabricated such as the claw or interference components that will become clearer as this specification continues.

Example—Iris-Based Joint Mechanism (FIGS. 2A-2G, 3A-3B, 4, 5, 6A-6C, 7A-7B, 8, 9A-9C, and 10A-10E)

In an embodiment, the current invention is an iris-based joint mechanism/apparatus, generally denoted by the reference numeral 2, that can be used with various rehabilitation (e.g., assisted drive, direct drive, resistive, etc.) devices. Mechanism 2 is positioned at a hinge joint (e.g., typically elbow, knee, or ankle joint) and is configured to be coupled both to an upper clamp that secures a body part superior to the hinge joint (e.g., upper arm or thigh) and to a lower clamp that secures a body part inferior to the hinge joint (e.g., forearm, calf, or corresponding prosthesis). Herein, mechanism 2 will be described with reference to a forearm-securing component (reference numeral 70), but it can be understood that forearm-securing component 70 may be replaced by another suitable limb-securing clamp/device, simply by detaching from forearm-securing component 70 and coupling mechanism 2 to the appropriate limb-securing clamp/device.

Figure 3A:
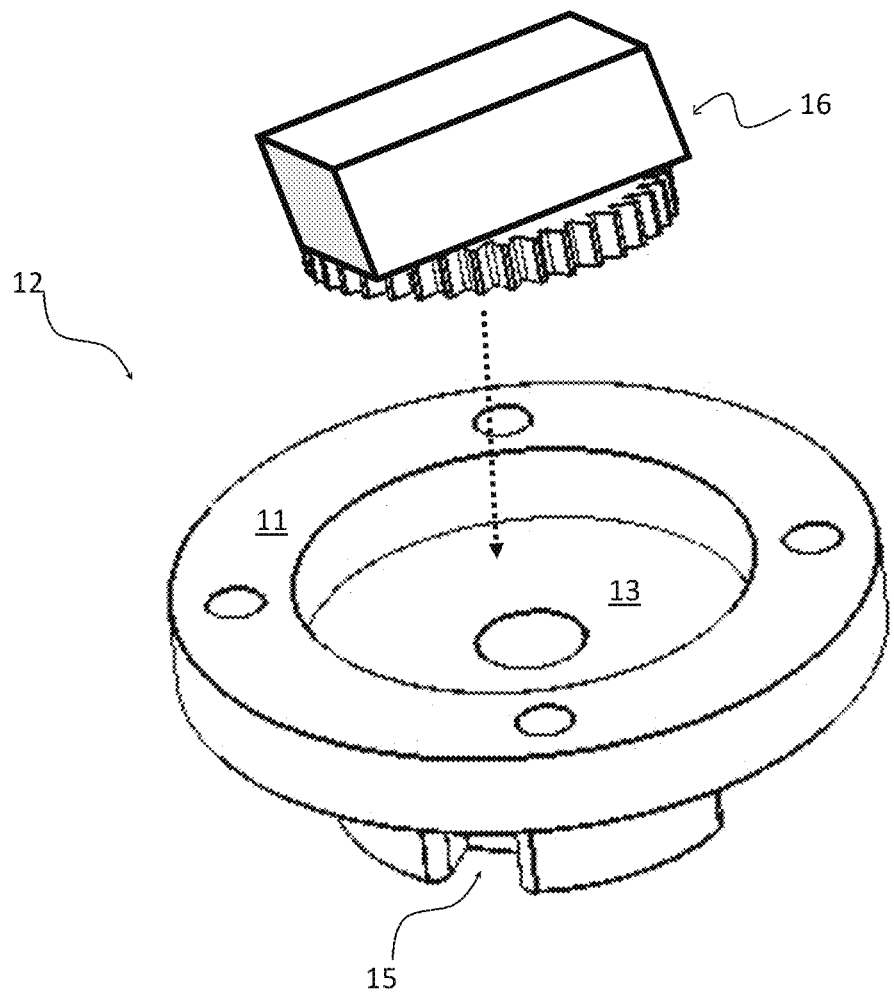
FIG. 3A is a perspective view of a hub component as may be used in an iris-based joint mechanism, according to an embodiment of the current invention.
Figure 3B:
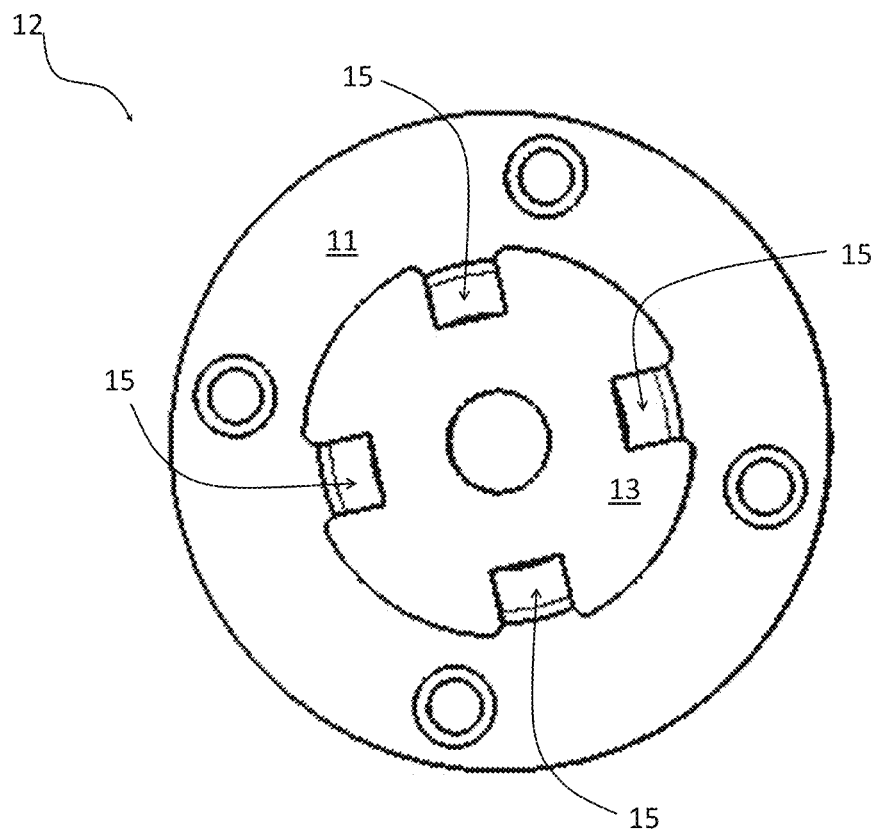
FIG. 3B is a bottom view of the hub component of FIG. 3A.
Figure 4:
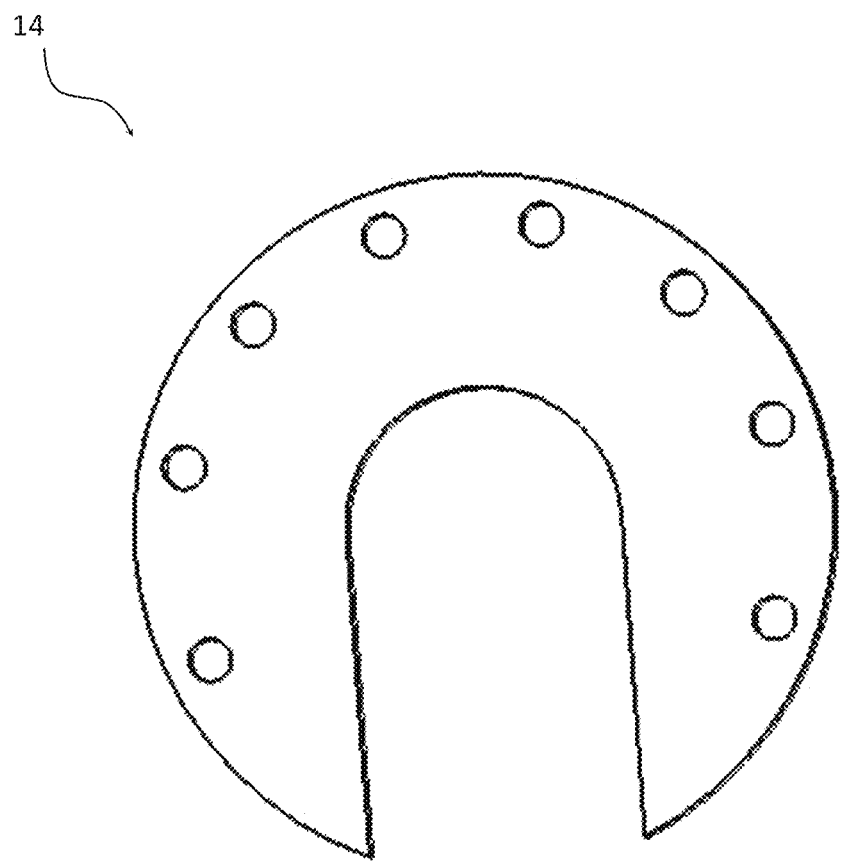
FIG. 4 depicts a cap component as may be used in an iris-based joint mechanism, according to an embodiment of the current invention.

As can be seen in FIGS. 2A-2G, which depict the entirety of mechanism 2 from different viewpoints, joint mechanism 2 generally includes outer assembly 10, iris mechanism 20, and inner assembly 60. Outer assembly 10 is formed of omega hub 12 and cap 14. As seen in FIGS. 3A-3B, omega hub 12 includes outer coupling ring 11 and inner coupling ring 13, where outer coupling ring 11 is configured to rotatably couple to an upper limb-securing component (not shown) and inner coupling ring 13 is configured to couple to or otherwise communicate with iris mechanism 20. Inner coupling ring 13 further includes channels or notches 15, which may rotate and align/misalign with channels or notches 42 of upper plate 40 for receiving flanges 34 of key element 30. This will become clearer as this specification continues.

Omega hub 12 is rotatable relative to the remainder of mechanism 2 but in certain circumstances, can be locked such that it rotates with the remainder of mechanism 2. Rotation of hub 12 is driven by servo 16, which includes a motor and gear in communication with hub 12. It is contemplated herein that any suitable servo may be utilized to drive rotation of hub 12.

When mechanism 2 is assembled, cap 14 is positioned between outer ring 11 and inner ring 13 of hub 12. Cap 14 not only functions as a protective covering between iris mechanism 20 and outer ring 11 of omega hub 12 (see FIG. 4 to view cap 14 in isolation), but also functions to hold hub 12 in place while permitting rotation thereof.

Figure 5:
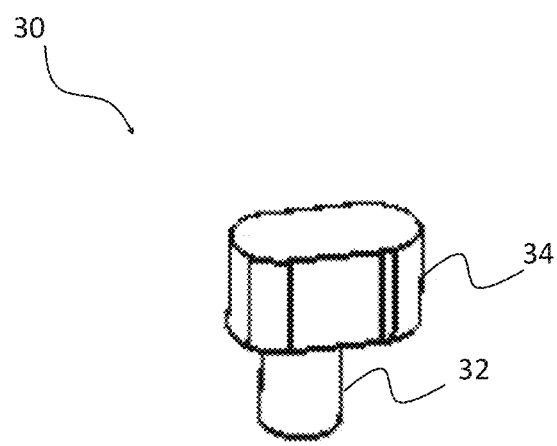
FIG. 5 is an isolated view of one of a plurality of key elements that may be used in an iris-based joint mechanism, according to an embodiment of the current invention.

FIG. 5 depicts key element 30 in isolation from mechanism 2, though typically a plurality of key elements 30 are utilized herein. Key element 30 includes pin 32 and flange 34. Pin 32 typically is thinner than flange 34 and is offset from the center of flange 34. Pin 32 extends inwardly from flange 34. Pins 32 are disposed within linear elongate channels 52 of driven gear 50, which will become clearer as this specification continues. Further, as briefly noted previously, flanges 34 are disposed within notches/channels 42 of upper plate 40 and sometimes within crenellations/channels 15 of omega hub 12.

Figure 6A:
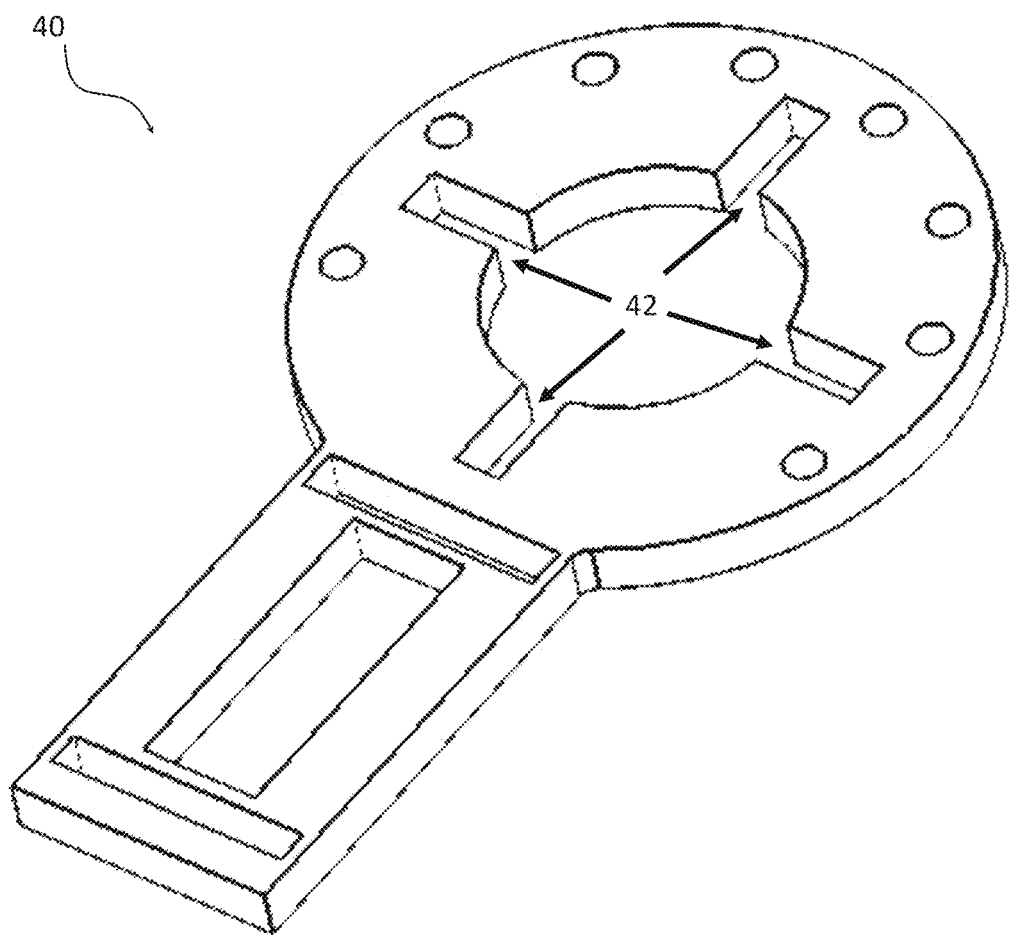
FIG. 6A depicts an upper plate component as may be used in an iris-based joint mechanism, according to an embodiment of the current invention.

Now referring to FIG. 6A, upper plate 40 includes channels or notches 42 disposed through upper plate 40. The figure depicts four (4) channels 42, though any number of suitable channels 42 may be utilized. Inner ring 13 may be positioned within the central aperture of upper plate 40, where inner ring 13 (and thus omega hub 12) may rotate relative to upper plate 40.

Figure 6B:
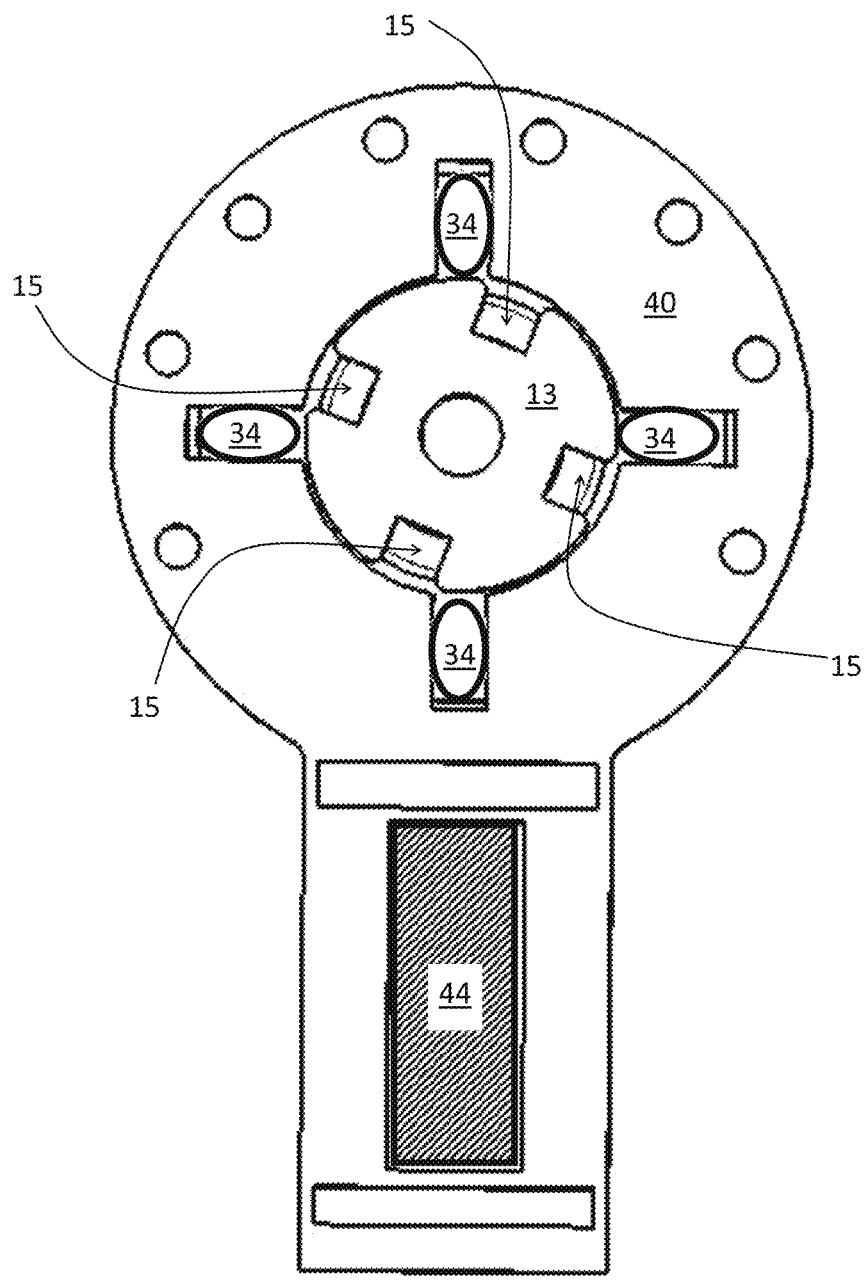
FIG. 6B is an elevated rear view of the hub component of FIG. 3A, key elements of FIG. 5, and upper plate component of FIG. 6A, as shown in a disengaged position.
Figure 6C:
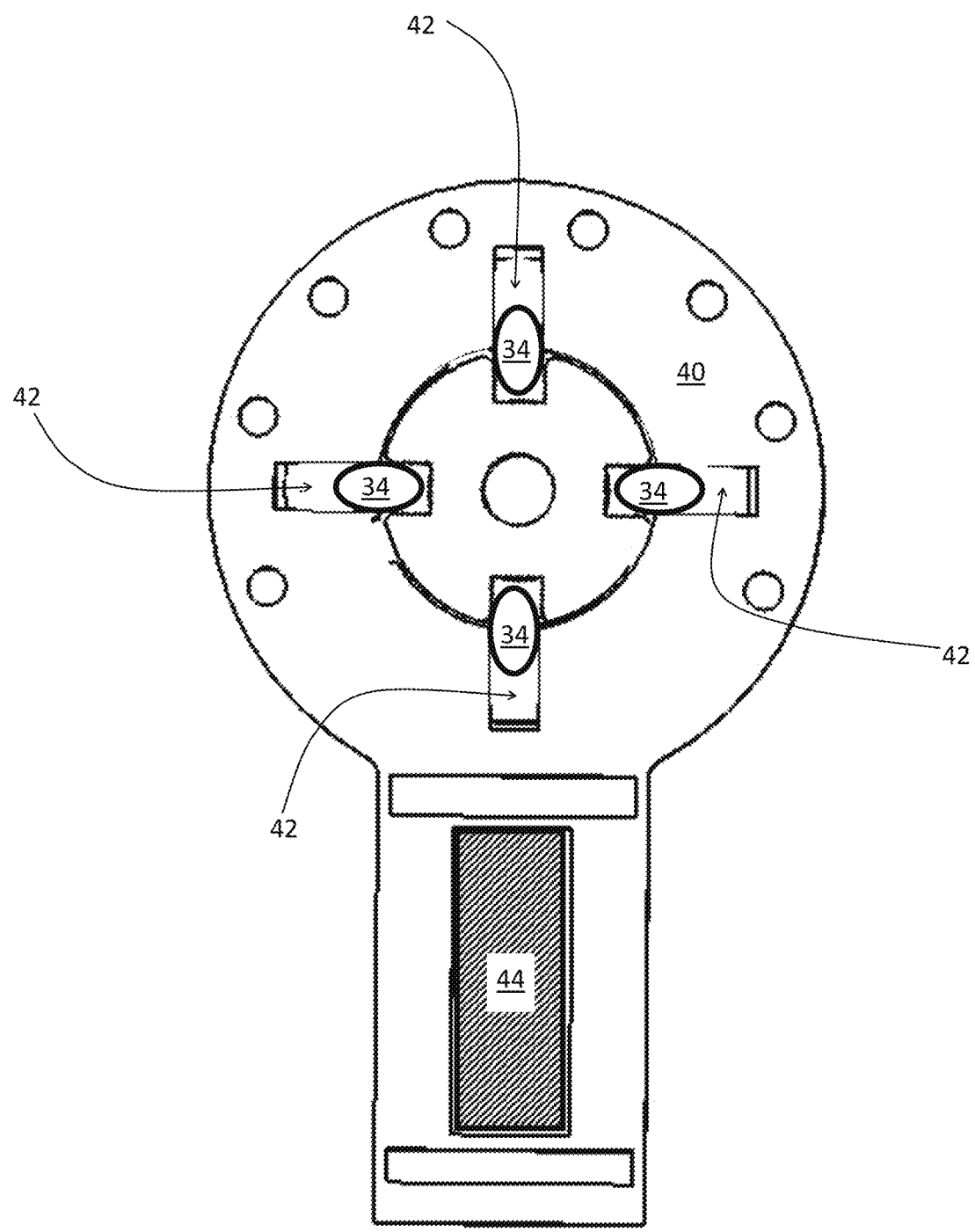
FIG. 6C is an elevated rear view of the hub component of FIG. 3A, key elements of FIG. 5, and upper plate component of FIG. 6A, as shown in an engaged position.

FIG. 6B depicts an assembly of omega hub 12 (specifically inner ring 13 and channels 15), key elements 30 (specifically flanges 34), and upper plate 40. In this figure, channels 15 are not aligned with channels 42. When channels are not aligned with channels 42, flanges 34 of key elements 30 remain disposed within channels 42 of upper plate 40. In this position, mechanism 2 is disengaged, hub 12 is fully rotatable relative to the remainder of mechanism 12, and the user of mechanism 2 has full range of motion of the hinge joint (e.g., elbow). In the example of an arm being rehabilitated, hub 12 moves with the upper arm, and the remainder of mechanism 2 moves with the forearm.

When the user wishes to power or engage mechanism 2, the user engages the actuator, such as a simple button or other suitable sensor or mechanism. Engaging the actuator (e.g., pressing the button) activates servo 16, which in turn automatically causes hub 12 to rotate to a precise position where channels 15 of hub 12 align with channels 42 of upper plate 40 (see FIG. 6B for visual indication). Simultaneous with or after channels 15 align with channels 42, servo 44 is activated, in turn rotating gear 54 and gear 50, such that pins 32 slide along channels 52 of gear 50 and flanges 34 slide partially out of channels 42 of upper plate 40 and into channels 15 of hub 12. In this scenario, a portion of flanges 34 is disposed in channels 15 and a portion of flanges 34 is disposed in channels 42, thus locking the components together. See FIG. 6C. Once locked in place, servo 16 continues to power and control rotation of hub 12. Now, however, with hub 12 locked with the remainder of mechanism 2, rotation of hub 12 provides a force on the remainder of mechanism 2, thus driving rotation of the remaining components or providing resistance as the user rotates the limb in a particular direction. There is a single range of motion for the underlying hinge joint. It can be understood based on the structure described herein that key elements 30 transmit the torque to upper plate 40, thus rigidifying mechanism 2 and preventing any potential breakage. It can be understood that this amount of force (and thus amount of drive or resistance) is adjustable based on output of servo 15. Engaging mechanism 2 can be seen in a transition from FIG. 6B to FIG. 6C.

To disengage, the actuator can again be engaged (e.g., pressing the same or different button), causing servo 44 to rotate gear 54 and gear 50, such that pins 32 slide along channels 52 of gear 50 and flanges 34 slide out of channels 15 of hub 12 and entirely into channels 42 of upper plate 40. Simultaneous with or after flanges 34 slide into channels 42 of upper plate 40, servo 16 is activated, causing hub 12 (specifically channels 15) to rotate out of alignment with channels 42. In this position, mechanism 2 is disengaged, hub 12 is fully rotatable relative to the remainder of mechanism 12, and the user of mechanism 2 has full range of motion of the hinge joint. Disengaging mechanism 2 can be seen in a transition from FIG. 6C to FIG. 6B.

Figure 7A:
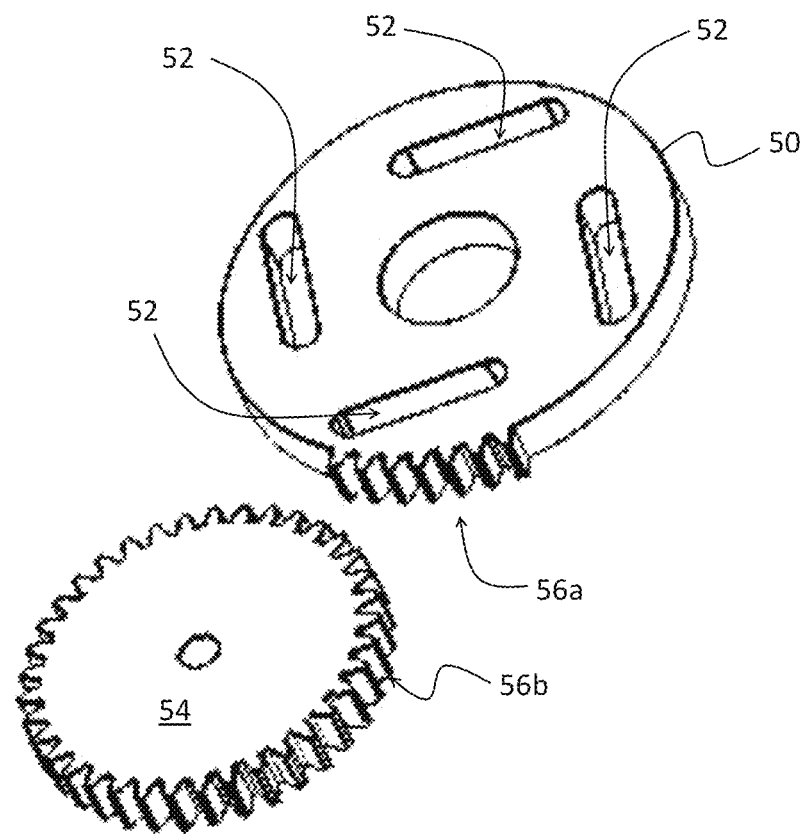
FIG. 7A is a perspective view of a gear and gear plate assembly as may be used in an iris-based joint mechanism, according to an embodiment of the current invention.
Figure 7B:
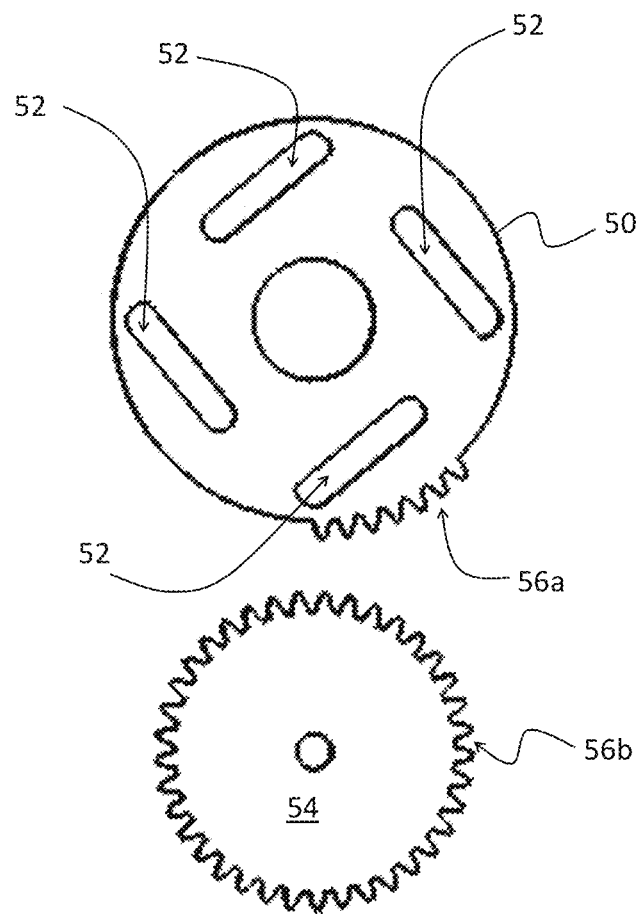
FIG. 7B is an elevated front view of the gear and gear plate assembly of FIG. 7A.

FIGS. 7A-7B more closely depict the gears that drive and control rotation of limb(s) being rehabilitated. The gear assembly is formed of driven gear 50 and driving gear 54. Driven gear 50 further includes a plurality of linear, elongate channels 52 disposed therethrough around the circumference of driven gear 50. Pins 32 are slidably disposed within channels 52, such that pins 32 may slide along the length of channels 52. Driven gear 50 also includes teeth 56a that are disposed partially around the circumference thereof, and driving gear 54 includes teeth 56b that are disposed partially or entirely around the circumference thereof. Teeth 56a and teeth 56b are configured to mesh with each other, and as such, rotation of driving gear 54 drives rotation of driven gear 50.

Rotation of driven gear 50 causes synchronistic sliding of pins 32 along/within channels 52 of gear 50. As most clearly seen in FIG. 7B, channels 52 are angled, each having one end that is closer to the outer perimeter of gear 50 than the opposite end, which is closer to the central aperture of gear 50. This angle dictates the amount/distance of radial movement of flanges 34 within channels 42 of upper plate 40 and into channels 15 of hub 12.

Figure 8:
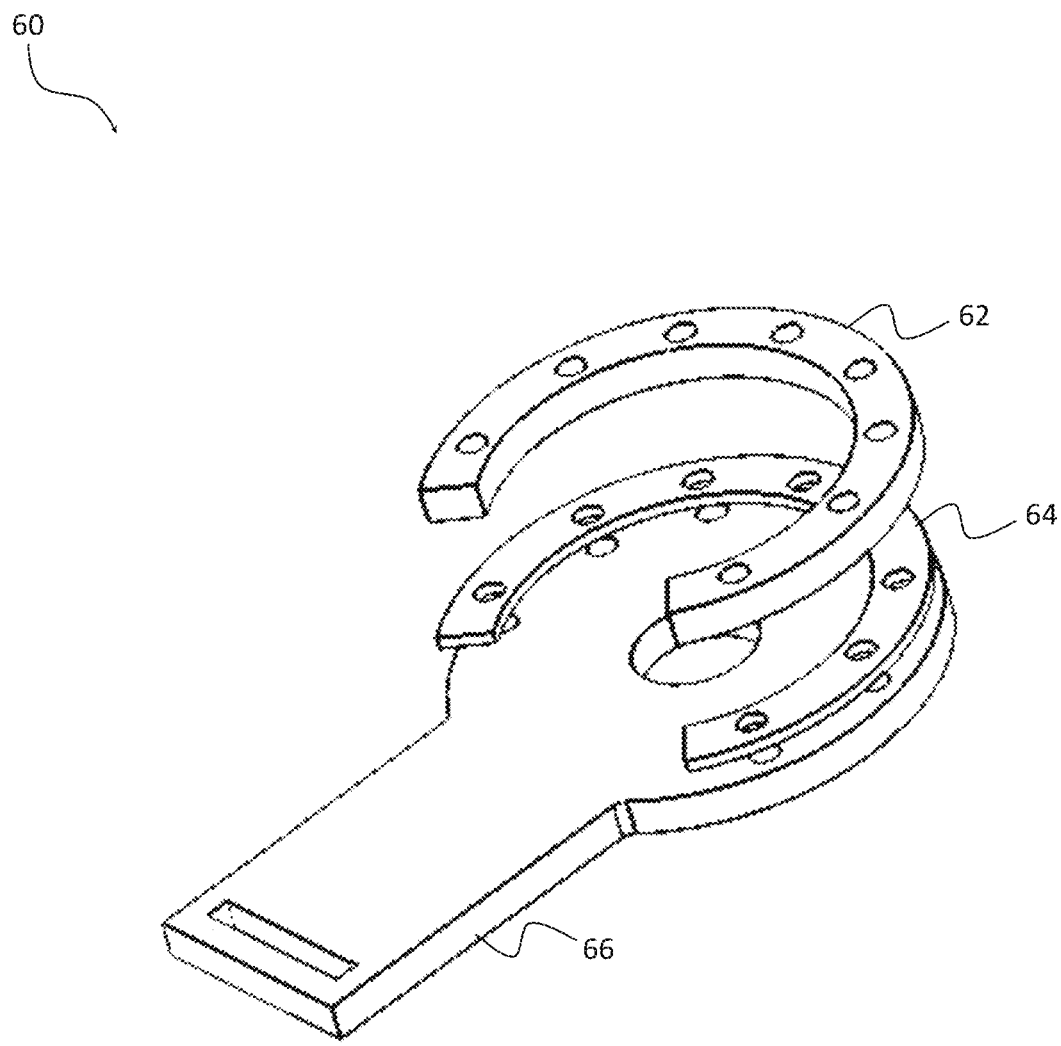
FIG. 8 is an exploded view of an assembly of brackets and lower plate as may be used in an iris-based joint mechanism, according to an embodiment of the current invention.

Now referring to FIG. 8, inner assembly 60 includes thick bracket 62, thin bracket 64, and lower plate 66. Inner assembly 60 functions not only as a protective covering between iris mechanism 20 and forearm-securing component 70 (or other lower limb-securing clamp), but also as a spacer that provides sufficient space for the gears. In turn, forearm-securing component 70 includes coupling plate 72 that couples to the remainder of mechanism 2 and forearm guide 74 that defines forearm channel 76 (see FIG. 9A).

Figure 9A:
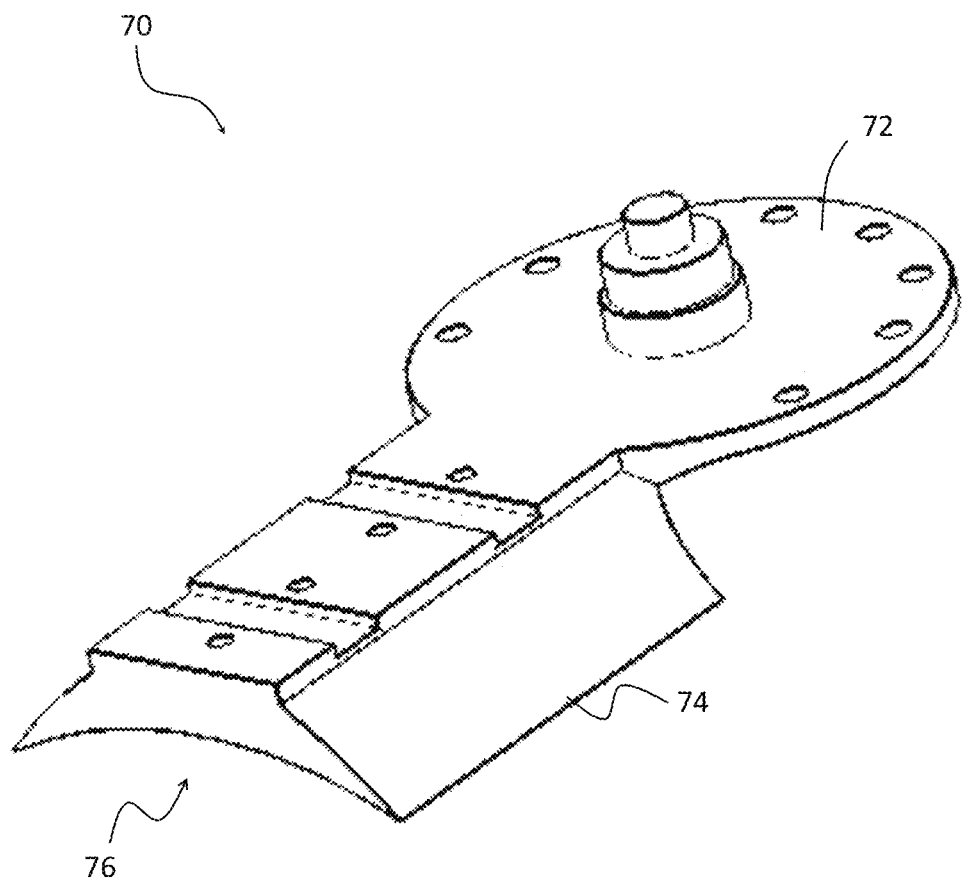
FIG. 9A depicts a forearm plate as may be used in an iris-based joint mechanism, according to an embodiment of the current invention.
Figure 9B:
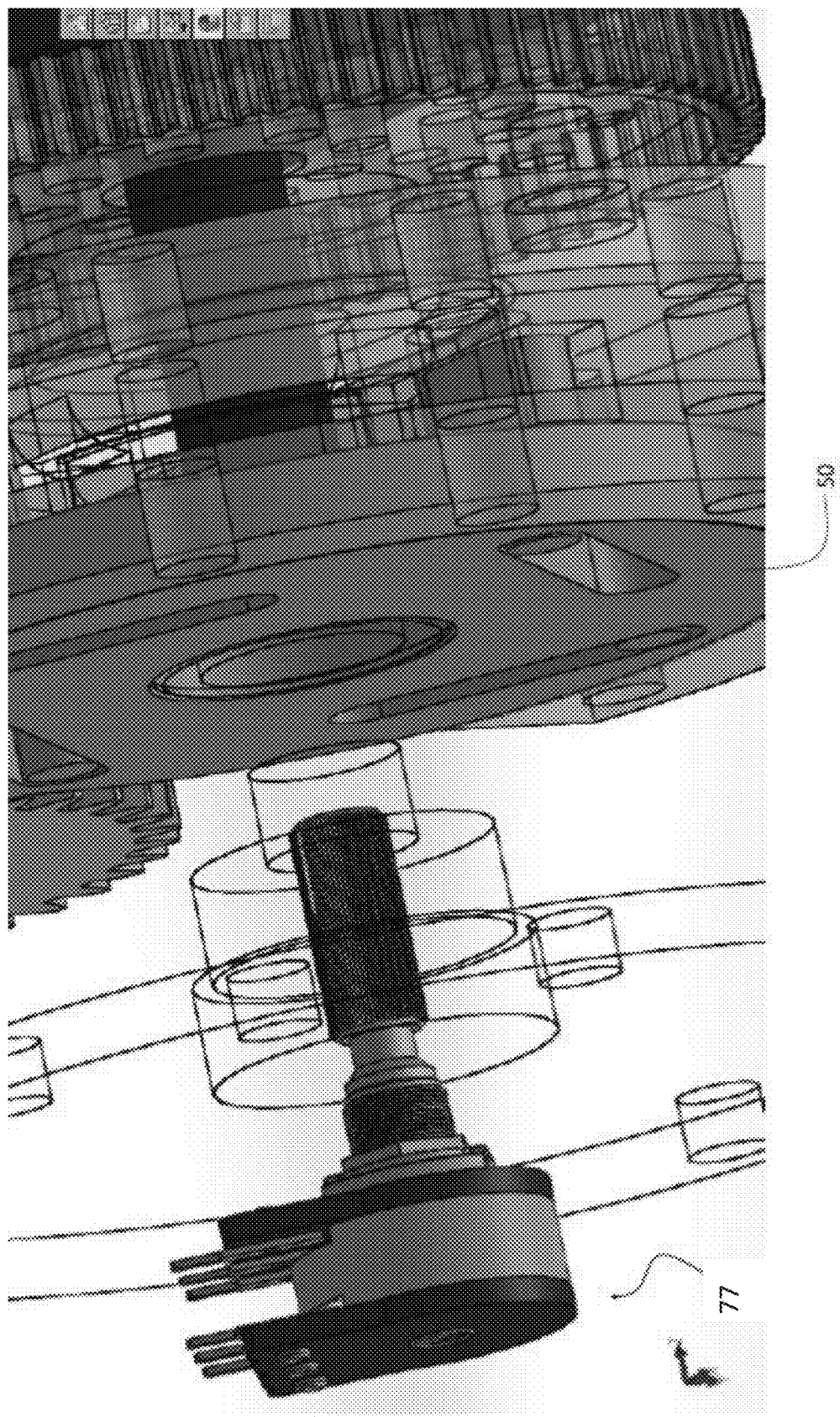
FIG. 9B depicts a potentiometer disposed through the central apertures of the iris-based joint mechanism, according to an embodiment of the current invention.
Figure 9C:
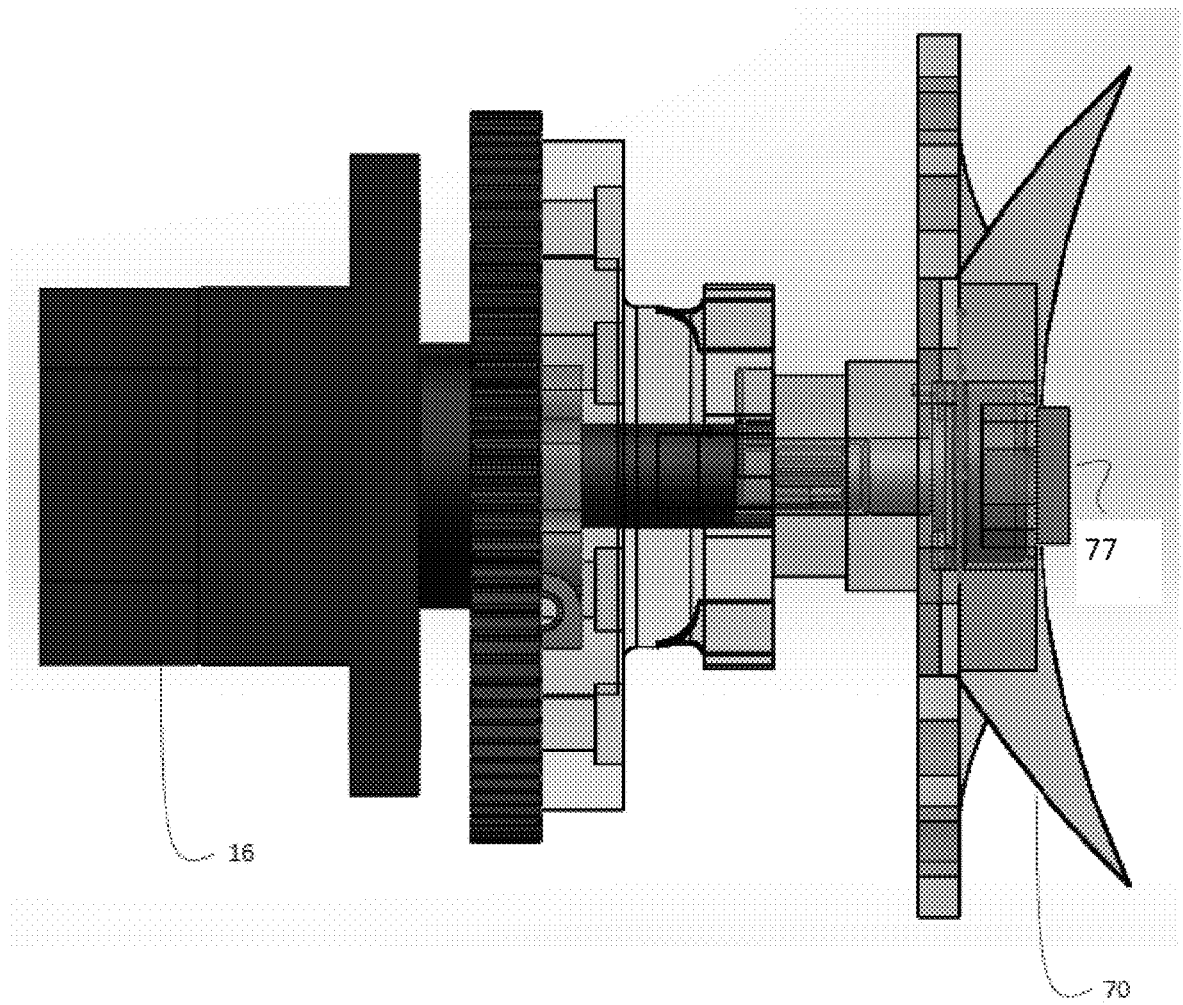
FIG. 9C is an exploded view of the potentiometer of FIG. 9B.
Figure 10A:
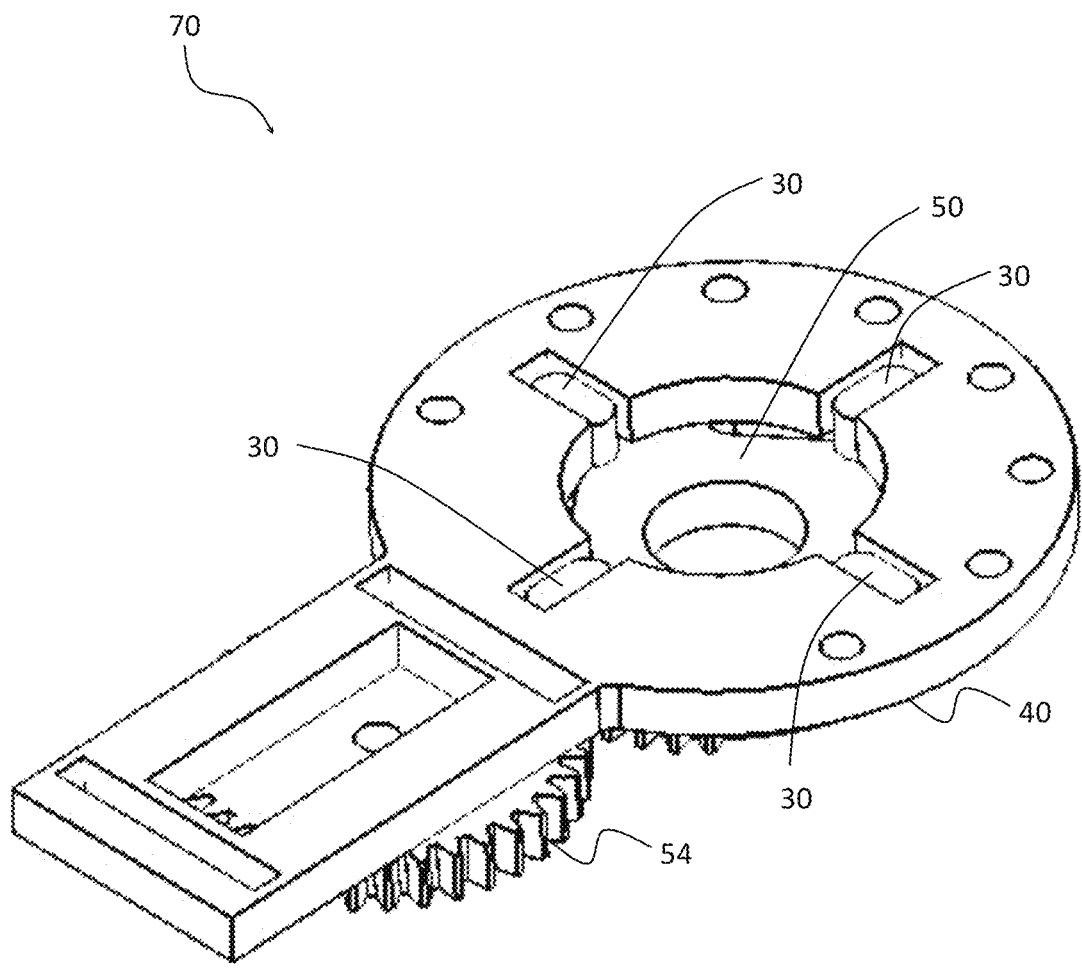
FIG. 10A is a perspective view of an exemplary iris mechanism as used within the broader joint mechanism, according to an embodiment of the current invention.
Figure 10B:
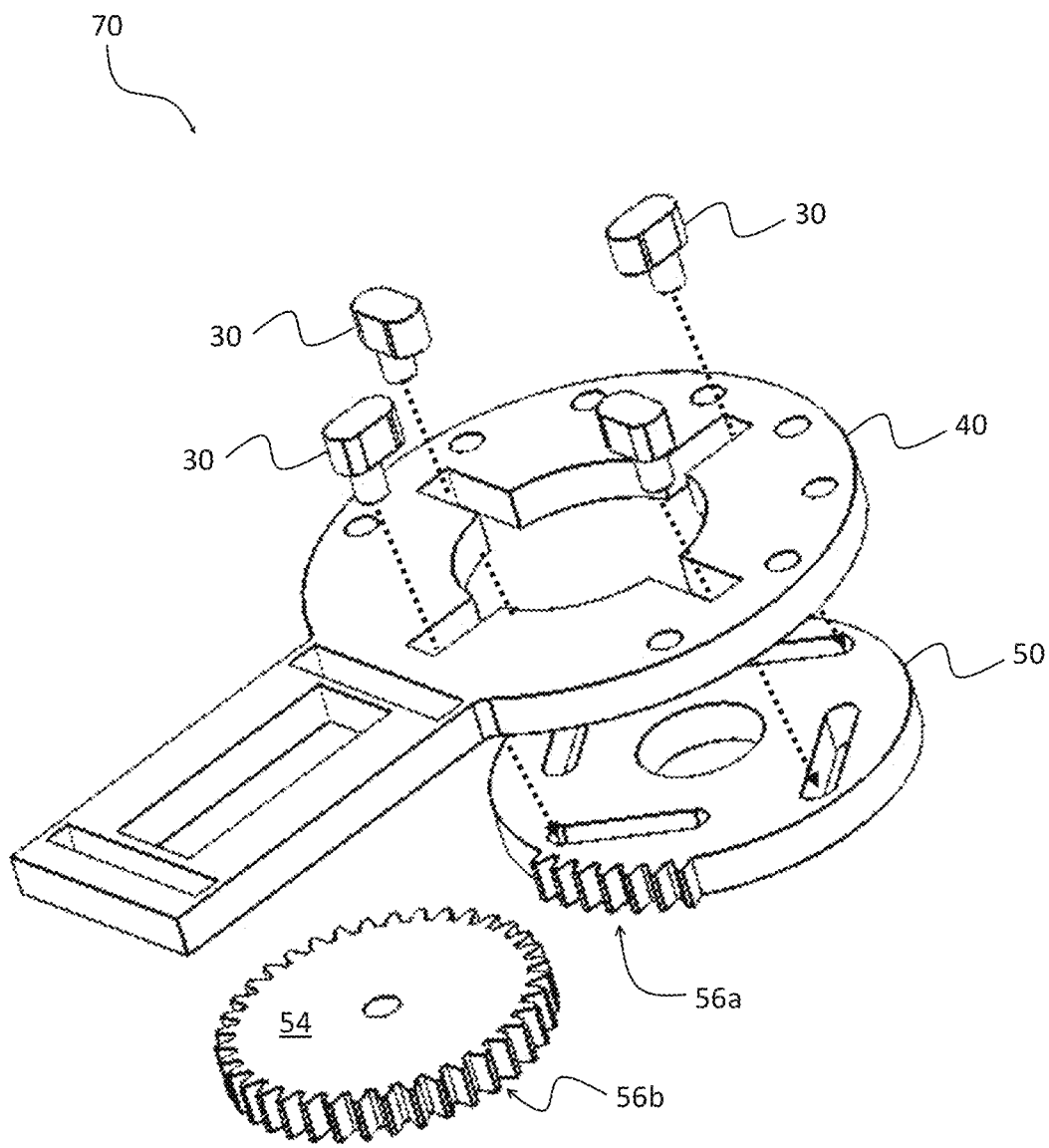
FIG. 10B is an exploded view of the iris mechanism of FIG. 10A.
Figure 10C:
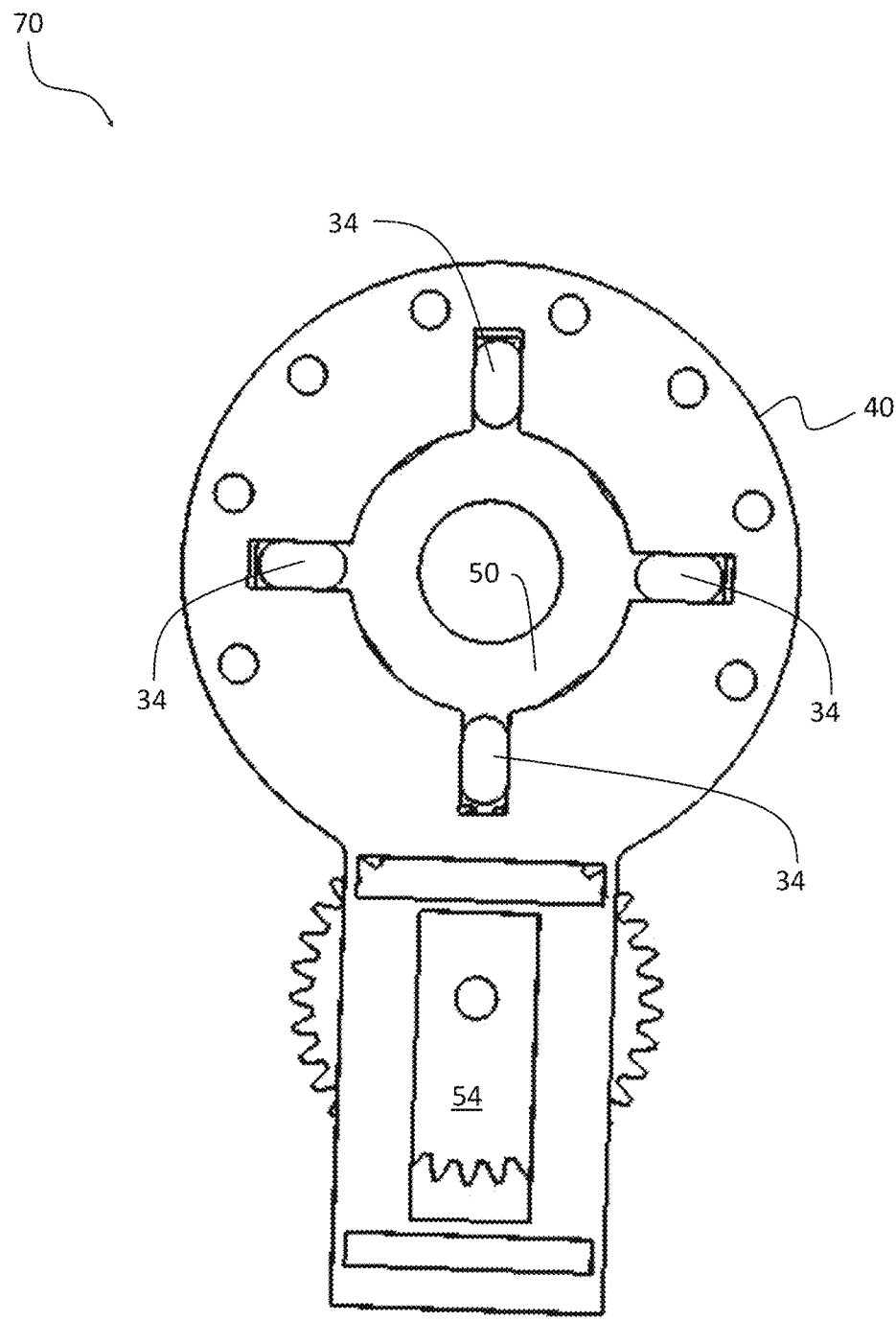
FIG. 10C is an elevated front view of the iris mechanism of FIG. 10A.
Figure 10D:
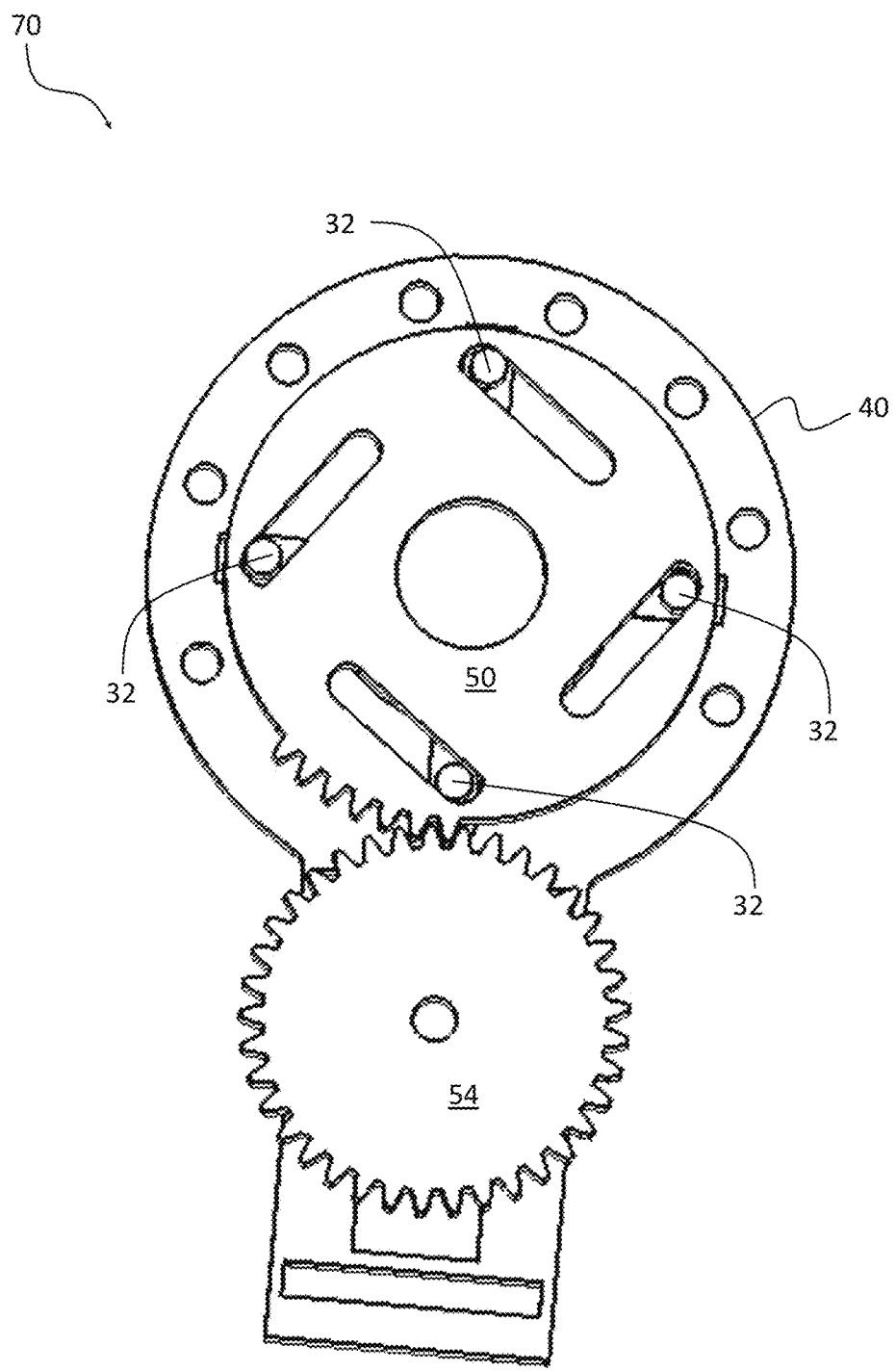
FIG. 10D is an elevated rear view of the iris mechanism of FIG. 10A.

Additionally, as indicated in FIGS. 9B-9C, potentiometer 77 is disposed within forearm-securing component 70 and is in communication with hub 12 and servo 16 through the central apertures of each of the components therebetween and by being coupled to the central shaft of servo 16. Potentiometer 77 tracks the rotation and positioning of hub 12 based on its communication with servo 16. Specifically, a portion of potentiometer 77 rotates with rotation of the central shaft of servo 16, and another portion of potentiometer 77 is affixed to forearm-securing component 70 and thus rotates with rotation of the lower limb. As the user's arm (or other limb) rotates, potentiometer 77 tracks position of hub 12 and will control exactly where hub 12 needs to rotate for channels 15 to align with channels 42. For example, potentiometer 77 may read 0 volts when the user's arm is in an extended position, and potentiometer 77 may read 5 volts when the user's arm is in a contracted position. Potentiometer 77 knows then that channels 15, 42 will align at 3 volts, and as such, potentiometer 77 tells servo 16 to force hub 12 to rotate accordingly and stop at the appropriate position.

FIGS. 10A-10E depict various views of iris mechanism 20 in isolation in order to further illustrate the mechanisms described above. Hub 12 and servo 44 are not shown in these figures for clarity of illustration.

In operation, the iris-based design is more effective and efficient than that seen in the conventional art. Mechanism 2 is fast-acting and compact, with key elements 30 traveling a smaller distance, thus decreasing engage/disengage time. Mechanism 2 further allows for a plurality of such key elements 30 to engage servo 16 instantaneously at different positions, thus allowing the load of an impaired limb to be distributed evenly among the four (4) key elements 30 and mitigating stress/wear incurred upon each key element 30. The ability to quickly disengage mechanism 2 improves the safety of the overall rehabilitation device, thus ensuring that the user is not injured by the largest servo. Mechanism 2 and underlying iris mechanism 20 requires rotational motion to actuate key elements 30, where such rotational motion is supplied by servo 44. As such, gears 50, 54 should translate rotation from servo 44 to gear 50. Meshing of gears 50, 54 allows for a flatter design, as well as allowing for servo 44 to be placed in greater proximity to gear 50, increasing design compactness.

Testing
Finite Element Analysis Test 1

The purpose of this test was to study transmission and stress concentration locations. In procedure, a force of 22N (about 5 lbs) was applied normal to the clutch arm on one side. The main objective of the test was to evaluate where the forces would be distributed if the servo arm transmitted its torque to the interlocking tooth mechanism. The fixed faces were the bottom of the heavy-duty pins and bottom of the plate, which guides the linear mechanism. The force faces were the lower arm, right side of the tooth, and full face with 22N (4.95 lbs). The results proved that the pins and the corners of the linkage mechanism will deform first.

Finite Element Analysis Test 2

The purpose of this test was to study transmission and stress concentration locations. In procedure, a force of 22N (about 5 lbs) was applied normal to both faces. The main objective of the test was to see if there was any back-force to the linkage mechanism that could potentially bend those vulnerable locations. The results proved that the pins (fixed with the orange arrows) take on the full force of the mechanism transmission since the pins are collinear with the forces applied.

Factor of Safety

Servo Torque at 6V is 2814 oz-in =176 lb-in =22 lbs at 8" [length of arm=8 inches]

Human Arm≈7% of Total Weight

∴ 130 lbs [her weight]×0.07=9.1 lbs 10 lbs [with mechanism]

$$\therefore \text{Factor of safety} = \frac{\text{mechanism spec. allowable weight}}{\text{application weight [the payload]}} = \frac{22 \text{ lbs}}{10 \text{ lbs}} = 2.2$$

Desire: to maintain a factor of safety of 2.0

$X_{lbs} \times 0.07 = Y$ $$\frac{22 \text{ lbs}}{Y \text{ lbs}} \geq 2.0 \rightarrow \therefore X_{lbs} = \frac{11}{.057} = 157 \text{ lbs}$$

Round ↓: Therefore $X_{max}$≈155 lbs With a factor of safety of 2.0

Operation

The rehabilitation device is secured to the patient's arm. The arm and elbow should be able to freely rotate for maximum power transmission, though the padding may prohibit complete upward rotation of the arm. The device is actuated via the user controller. The arm should be held in a comfortable position, and the servos begin spinning based on user input on the joystick. This engages the device. A joystick can be pushed forward to lower the arm and pulled backward to raise the arm. User input on the joystick can then disengage the device as well, as the motor ceases spinning.

Potential Applications

Assisted Drive.

The current device can help a person who has lost full or partial control of that limb, for example an individual who has lost the ability to extend her arm but still be able to retract that arm. Thus, the current device was developed to have the capability for her triceps, which is the muscle responsible for extension, to be stimulated and rehabilitated, while at the same time avoiding muscular atrophy of the muscles that were unaffected. This requires a mechanism that can be engaged and disengaged by the user, so that the device can be engaged during extension and disengaged during retraction, as the case may be.

Direct Drive.

Since the device has the ability to be engaged at any time, it can also be fully engaged all the time. This allows for a user, who has complete loss of a limb, to be able to control that limb using various sensors.

Resistive Rehabilitation Drive.

The voltage supplied to the device is adjustable. By varying the voltage that powers the device, the torque that the device outputs can also vary based on need. In other words, the user can apply force against the motion of the motor and thus gain muscle strength using resistance from the device. This motor is detachable for safety purposes.

Glossary of Claim Terms

Angled: This term is used herein to refer to the orientation of a channel having one end closer to a perimeter of a gear and an opposite end further from the end of the gear, for example as seen by the structure indicated by reference numeral 52 in FIG. 7B.

Crenellations: This term is used herein to refer to the troughs/notches/channels in a series or pattern of peaks of troughs.

Disengaged position: This term is used herein to refer to a specific arrangement of components that correspond to the overall mechanism/device being idle or otherwise unpowered.

Engaged position: This term is used herein to refer to a specific arrangement of components that correspond to the overall mechanism/device being powered.

Freely rotatable: This term is used herein to refer to one component being capable of rotating relative to another component without interference from that other component.

Full range of motion: This term is used herein to refer to the full movement potential of a hinge joint.

Iris-based hinge joint mechanism: This term is used herein to refer to an assembly of structural components used in the rehabilitation of a limb or joint, where the assembly is positioned at or near the hinge joint of the underlying limb.

Key element: This term is used herein to refer to a coupling component that provides communication among the hub, plate, and driven gear, such that when the hinge joint mechanism is engaged, movement of one moves the others due to the coupling component contacting each.

Rehabilitation exoskeleton: This term is used herein to refer to a robotic device worn by a user in the rehabilitation or therapy of an impaired limb (or part thereof).

Servo: This term is used herein to refer to a system or motor for powering and/or controlling the rotation/movement of a component of the underlying hinge joint mechanism.

Single range of motion: This term is used herein to refer to movement potential of a hinge joint in one or two directions, e.g., depending on whether the exoskeleton is directly driving the limb or providing resistance against movement of the limb.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

The invention claimed is:

1. An iris-based hinge joint mechanism for a rehabilitation exoskeleton, wherein the iris-based hinge joint mechanism has an engaged position and a disengaged position, comprising:
a hub including a plurality of crenellations;
a main servo in communication with the hub for driving rotation of the hub;
a plate disposed adjacent to the hub, wherein
the plate includes a plurality of notches disposed through the plate,
the plurality of notches are aligned with the plurality of crenellations in the engaged position, such that one of the crenellations and one of the corresponding aligned notches form a channel therebetween in the engaged position,
the plurality of notches are not aligned with the plurality of crenellations in the disengaged position, such that the channel between the crenellation and the corresponding aligned notch is not formed in the disengaged position;
a driven gear having a plurality of elongate channels disposed through the driven gear and around the interior of the circumference of the driven gear, wherein the plurality of elongate channels are angled between a perimeter and a center of the driven gear;
a driving gear in communication with the driven gear;
a secondary servo in communication with the driving gear for driving rotation of the driving gear; and
a plurality of key elements, each having a first end disposed within one of the notches of the plate and a second end slidably disposed within one of the elongate channels of the driven gear, wherein
in the disengaged position, the first end of the each key element is not disposed in one of the crenellations of the hub,
in the engaged position, the first end of the each key element is partially disposed in the notch of the plate and partially disposed in the crenellation of the hub.

2. The iris-based hinge joint mechanism as in claim 1, further comprising a cap that restricts movement of the hub while permitting rotation of the hub.

3. The iris-based hinge joint mechanism as in claim 1, wherein:
the driven gear includes teeth disposed partially around the perimeter thereof,
the driving gear includes teeth that mesh with the teeth of the driven gear, such that rotation of the driving gear drives rotation of the driven gear.

4. The iris-based hinge joint mechanism as in claim 1, wherein in the disengaged position, the hub is freely rotatable relative to the remainder of the iris-based hinge joint mechanism, such that a user has full range of motion of a limb wearing the rehabilitation exoskeleton.

5. The iris-based hinge joint mechanism as in claim 4, wherein in the engaged position, the hub is locked with the remainder of the iris-based hinge joint mechanism, and the main servo outputs a force to drive rotation of the hub with the remainder of the iris-based hinge joint mechanism, such that the user has a single range of motion of the limb wearing the rehabilitation exoskeleton.

6. The iris-based hinge joint mechanism as in claim 5, wherein an amount of the force is controllable by an adjustable amount of voltage supplied by the main servo.

7. The iris-based hinge joint mechanism as in claim 1, further comprising a spacer positioned on a side of the driven gear opposite from the plate, wherein the spacer provides a distance between the gears and a lower limb-securing component of the rehabilitation exoskeleton.

8. The iris-based hinge joint mechanism as in claim 1, wherein the first end of the each key element is a flange and the second end of the each key element is a pin.

9. The iris-based hinge joint mechanism as in claim 1, further comprising a potentiometer in communication with the hub, wherein
the potentiometer tracks a rotational position of the hub, upon transition from the disengaged position to the engaged position, the potentiometer automatically directs the main servo to rotate the hub so that the plurality of crenellations of the hub align with the plurality of notches of the plate.

10. An iris-based hinge joint mechanism for a rehabilitation exoskeleton, wherein the iris-based hinge joint mechanism has an engaged position and a disengaged position, comprising:
an iris mechanism including a plurality of key elements that each have a first end and a second end; and
a hub in communication with the iris mechanism,
wherein in the engaged position, the first end of the each key element engages the hub to lock the hub with the iris mechanism, such that the hub and iris mechanism rotate together,
wherein in the disengaged position, the first end of the each key element does not engage the hub, such that the hub is freely rotatable relative to the iris mechanism,
wherein the second end of the each key element is slidably disposed within elongate channels in the iris mechanism in the engaged and disengaged positions.

11. The iris-based hinge joint mechanism as in claim 10, further comprising a cap that restricts movement of the hub while permitting rotation of the hub.

12. The iris-based hinge joint mechanism as in claim 10, wherein the iris mechanism further includes:
a plate disposed adjacent to the hub, wherein
the plate includes a plurality of notches disposed through the plate,
the plurality of notches are aligned with a plurality of crenellations in the engaged position, such that one of the crenellations and one of the corresponding aligned notches form a channel therebetween in the engaged position,
the plurality of notches are not aligned with the plurality of crenellations in the disengaged position, such that the channel between the crenellation and the corresponding aligned notch is not formed in the disengaged position;
a driven gear having the plurality of elongate channels disposed through the driven gear and around the interior of the circumference of the driven gear, wherein the plurality of elongate channels are angled between the perimeter and a center of the driven gear;
a driving gear in communication with the driven gear;
a secondary servo in communication with the driving gear for driving rotation of the driving gear.

13. An iris-based hinge joint mechanism as in claim 12, wherein
the first end of the each key element is disposed within one of the notches of the plate,
in the disengaged position, the first end of the each key element is not disposed in one of the crenellations of the hub,
in the engaged position, the first end of the each key element is partially disposed in the notch of the plate and partially disposed in the crenellation of the hub.

14. The iris-based hinge joint mechanism as in claim 10, wherein in a transition from the disengaged position to the engaged position, the iris-based hinge joint mechanism further comprises:
a main servo that drives rotation of the hub to a position where the first end of the each key element can engage the hub;
a secondary servo that drives rotation of the iris mechanism to a position where the first end of the each key element engages the hub.

15. The iris-based hinge joint mechanism as in claim 10, further comprising a potentiometer in communication with the hub, wherein
the potentiometer tracks a rotational position of the hub, upon transition from the disengaged position to the engaged position, the potentiometer automatically directs the main servo to rotate the hub to the position where the first end of the each key element can engage the hub.

16. An iris-based hinge joint mechanism for a rehabilitation exoskeleton, wherein the iris-based hinge joint mechanism has an engaged position and a disengaged position, comprising:
a hub including a plurality of crenellations, wherein
in the disengaged position, the hub is freely rotatable relative to the remainder of the iris-based hinge joint mechanism, such that a user has full range of motion of a limb wearing the rehabilitation exoskeleton,
in the engaged position, the hub is locked with the remainder of the iris-based hinge joint mechanism, and a main servo outputs a force to drive rotation of the hub with the remainder of the iris-based hinge joint mechanism, such that the user has a single range of motion of the limb wearing the rehabilitation exoskeleton;
a cap that restricts movement of the hub while permitting rotation of the hub;
the main servo in communication with the hub for driving rotation of the hub;
a plate disposed adjacent to the hub, wherein
the plate includes a plurality of notches disposed through the plate,
the plurality of notches are aligned with the plurality of crenellations in the engaged position, such that one of the crenellations and a one of the corresponding aligned notches form a channel therebetween in the engaged position,
the plurality of notches are not aligned with the plurality of crenellations in the disengaged position, such that the channel between the crenellation and the corresponding aligned notch is not formed in the disengaged position;
a driven gear having a plurality of elongate channels disposed through the driven gear and around the interior of the circumference of the driven gear, wherein the plurality of elongate channels are angled between the perimeter and a center of the driven gear;
a driving gear in communication with the driven gear, wherein
the driven gear includes teeth disposed partially around the perimeter thereof, the driving gear includes teeth that mesh with the teeth of the driven gear, such that rotation of the driving gear drives rotation of the driven gear;

a secondary servo in communication with the driving gear for driving rotation of the driving gear;

a plurality of key elements, each having a first end disposed within one of the notches of the plate and a second end slidably disposed within one of the elongate channels of the driven gear, wherein in the disengaged position, the first end of the each key element is not disposed in one of the crenellations of the hub, in the engaged position, the first end of the each key element is partially disposed in the notch of the plate and partially disposed in the crenellation of the hub, the first end of the each key element is a flange and the second end of the each key element is a pin;

a spacer positioned on a side of the driven gear opposite from the plate, wherein the spacer provides a distance between the gears and a lower limb-securing component of the rehabilitation exoskeleton; and a potentiometer in communication with the hub, wherein the potentiometer tracks a rotational position of the hub, upon transition from the disengaged position to the engaged position, the potentiometer automatically directs the main servo to rotate the hub so that the plurality of crenellations of the hub align with the plurality of notches of the plate, wherein an amount of the force is controllable by an adjustable amount of voltage supplied by the main servo.

* * * * *